US012499487B1

(12) United States Patent
Yim et al.

(10) Patent No.: US 12,499,487 B1
(45) Date of Patent: Dec. 16, 2025

(54) SYSTEMS AND METHODS FOR PREVENTING MONEY LAUNDERING USING MASTER SMART CONTRACT ON BLOCKCHAIN

(71) Applicant: FMR LLC, Boston, MA (US)

(72) Inventors: Man Hei Raymond Yim, Cambridge, MA (US); Lu Qin, Revere, MA (US); Derrick Chan, Weston, MA (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 18/799,286

(22) Filed: Aug. 9, 2024

(51) Int. Cl.
*G06Q 40/06* (2012.01)
*G06Q 40/04* (2012.01)

(52) U.S. Cl.
CPC .......... *G06Q 40/06* (2013.01); *G06Q 40/04* (2013.01); *G06Q 2220/10* (2013.01)

(58) Field of Classification Search
CPC ..... G06Q 40/06; G06Q 40/04; G06Q 2220/10
See application file for complete search history.

(56) References Cited

U.S. PATENT DOCUMENTS

| | | | |
|---|---|---|---|
| 2019/0385236 A1* | 12/2019 | McConnell | H04L 9/50 |
| 2022/0385499 A1* | 12/2022 | Doney | G06F 16/9024 |
| 2024/0070665 A1* | 2/2024 | Gelfer | G06Q 40/06 |
| 2024/0086912 A1* | 3/2024 | Sirico | G06Q 40/06 |

FOREIGN PATENT DOCUMENTS

WO    WO-2017131929 A1 *  8/2017  ........... H04L 9/50

OTHER PUBLICATIONS

Fujimoto et al.: Proposal of a smart contract-based security token management system, 2022, IEEE Internation Conferece on Blockchain , pp. 419-426 (Year: 2022).*
Coutinho et al.: Governance token distribution of Layer-one.X blockchain, 2022, IEEE Asia-Pacific Conference on Computer Science and Data Engineering (CSDE), pp. 1-6 (Year: 2022).*

* cited by examiner

Primary Examiner — Bijendra K Shrestha
(74) Attorney, Agent, or Firm — Cesari and McKenna, LLP

(57) ABSTRACT

Systems and methods are described for preventing money laundering using a master smart contract. A master smart contract may be recorded on a blockchain, in which the master smart contract comprises one or more containers, that each include one or more tokens. The master smart contract is capable of rebalancing tokens in a container, in which each token is moved between containers in the master smart contract according to an automated process.

20 Claims, 12 Drawing Sheets

Changing Container Ideal Allocation

Administrator Wallet: 208ab1192... ▼
Container: c1d472... ABC Advisors Core ▼

| Token | Current Allocation | Current Ideal Allocation | Current Allocation Tolerance | New Ideal Allocation | New Allocation Tolerance |
|---|---|---|---|---|---|
| Token A | 11.5% | 10% | 1% | 8% | 1% |
| Token B | 2% | 2% | 0.5% | 2% | 0.5% |
| Token C | 0.5% | 3% | 0.5% | 5% | 1% |
| Token D | 0% | 0% | 0% | 0.5% | 0.3% |
| Token E | 3.7% | 3% | 0.5% | 4% | 1% |

Active Incremental Value: 2 bps  Max: 10 bps
Passive Decremental Value: 3 bps

Update Allocation

FIG. 8

SYSTEMS AND METHODS FOR PREVENTING MONEY LAUNDERING USING MASTER SMART CONTRACT ON BLOCKCHAIN

TECHNICAL FIELD

This application relates generally to systems and methods, including computer program products, for rebalancing tokens using a master smart contract on a blockchain to prevent the occurrence of money laundering.

BACKGROUND

The advent of blockchain technology has resulted in many unprecedented applications, such as tokens, which are digital assets recorded on a blockchain. Tokens may represent assets in the physical world, such as, for example, currency (e.g., cryptocurrency), financial instruments, and/or documents or images (e.g., artwork, photographs, books, videos, etc.). Further, tokens allow for secure, encrypted, and anonymous transactions between participants (a popular feature for those who wish to remain unidentified). In addition, tokens can also be traded with fiat currencies, thereby demonstrating their flexibility in daily usage.

Due to these features, tokens have become extremely popular within the past decade. Consequently, the use of tokens has quickly proliferated throughout the world. In fact, there are now more than tens of thousands of tokens that are actively being exchanged every day. However, not all of the tokens in existence have the same value. In other words, some tokens may be more valuable than other tokens. As such, individuals may collect tokens that they believe to be valuable or that may appreciate in the future. Individuals, who may not have the time or experience to determine which tokens are valuable, may utilize the services of a portfolio manager. Such portfolio manager may manage portfolios of tokens on behalf of such individuals. For example, the manager may perform research to determine which tokens are likely to appreciate in the future. Based on such research, the manager may exchange tokens in the portfolios that they are managing with other entities (e.g., via market exchanges).

However, such exchanges may unintentionally involve money laundering. For example, the manager may perform exchanges on a market exchange (e.g., Coinbase, Binance, etc.), in which there may be millions of exchanges happening at once. Further, since the entity with which the manager is exchanging tokens is anonymous (a feature of blockchain, as discussed previously), it is possible that the manager is unintentionally interacting with an entity that is trying to perform money laundering. As such, there remains a need for a better process to prevent the possibility of money laundering.

SUMMARY

The present disclosure, in one aspect, features a system for automatic rebalancing of tokens in a token collection, the system comprising a processor that executes computer-executable instructions to: manage a token collection that includes two or more tokens, wherein a current amount of each of the two or more tokens is associated with a current allocation value; receive instructions that includes a maximum value, an incremental value and an ideal allocation range for each of the two or more tokens, wherein the ideal allocation includes a range of values defined by an ideal allocation value having a tolerance specified by an allocation tolerance value, and wherein tokens whose amount is to be increased to fall within the ideal allocation range are assigned to a source group, tokens whose amount is to be decreased to fall within the ideal allocation range are assigned to a target group, and tokens whose amount remains within the ideal allocation range are assigned to both the source group and the target group; determine, for each possible token pair, an urgency value determined based on a source urgency value and a target urgency value, wherein each token pair includes a source token from the source group and a target token from the target group, and wherein a source urgency value is determined for the source token based on a corresponding current allocation value, ideal allocation value, and allocation tolerance value, and wherein a target urgency value is determined for the target token based on a corresponding current allocation value, ideal allocation value, and allocation tolerance value; and for each token pair having an urgency value that is greater than an urgency threshold, determine a first token value for the target token based on a preferred value obtained from a third-party service, the maximum value, and the incremental value, wherein the first token value indicates a maximum amount of source tokens that is capable of being converted into a predetermined amount of target tokens in another collection, wherein the first token value is greater than the preferred value, and determine other collections that indicate a proposal to convert the target token into a source token for an amount less than or equal to the token value; and generate a first conversion itinerary, based on first token values and proposals of other collections, wherein the first conversion itinerary indicates the most optimal set of conversions to perform with respect to the other collections, such that source tokens and target tokens corresponding to active token pairs fall within the ideal allocation range.

The instructions further include a decremental value. The computer executable instructions cause the processor to perform further operations to: for each token pair having an urgency value that is less than or equal to the urgency threshold, determine a second token value for the target token of the passive token pair based on a preferred value obtained from a third-party service and the decremental value in the instructions, wherein the second token value indicates a maximum amount of source tokens that is capable of being converted into a predetermined amount of target tokens in another collection, and wherein the second token value is less than the preferred value, and determine other collections that indicate a proposal to convert the target token into the source token for an amount less than or equal to the second token value. The computer executable instructions cause the processor to perform further operations to: generate a second conversion itinerary, based on second token values and proposals of other collections, wherein the second conversion itinerary indicates the most optimal set of exchanges to perform with the other collections, such that the source tokens and the target tokens remain within the ideal allocation. Source tokens in each token pair having an urgency value that is less than or equal to the urgency threshold are continuously converted into target tokens of the corresponding token pair until new instructions are received that includes a new maximum value, a new incremental value, and a new ideal allocation range for each of the two or more tokens. Urgency values, that are greater than the urgency threshold, indicate that a source token and a target token in a corresponding token pair are outside the ideal allocation, and wherein the urgency values that are less than or equal to the urgency threshold indicate that a source token and a target token in a corresponding token pair are within the ideal allocation. An allocation tolerance value corresponding to a token of the two or more tokens is decreased according to a tolerance adjustment value for each conversion that is performed with respect to the token according to the conversion itinerary until the amount of the token falls within a corresponding ideal allocation. The computer executable instructions cause the processor to perform further operations to: manage two or more additional token collections, wherein the token collection and the two or more additional token collections are managed by a single entity, and wherein the step of determining collections that indicate a proposal to convert the target token into a source token for an amount less than or equal to the token value is performed on the two or more additional token collections.

The present disclosure, in another aspect, features a non-transitory computer-readable medium including computer-executable instructions that, when executed by a computing device, causes the computing device to: managing a token collection that includes two or more tokens, wherein a current amount of each of the two or more tokens is associated with a current allocation value; receiving instructions that includes a maximum value, an incremental value and an ideal allocation range for each of the two or more tokens, wherein the ideal allocation includes a range of values defined by an ideal allocation value having a tolerance specified by an allocation tolerance value, and wherein tokens whose amount is to be increased to fall within the ideal allocation range are assigned to a source group, tokens whose amount is to be decreased to fall within the ideal allocation range, and tokens whose amount remains within the ideal allocation range are assigned to both the source group and the target group; determining, for each possible token pair, an urgency value determined based on a source urgency value and a target urgency value, wherein each token pair includes a source token from the source group and a target token from the target group, and wherein a source urgency value is determined for the source token based on a corresponding current allocation value, ideal allocation value, and allocation tolerance value, and wherein a target urgency value is determined for the target token based on a corresponding current allocation value, ideal allocation value, and allocation tolerance value; and for each token pair having an urgency value that is greater than an urgency threshold, determining a first token value for the target token based on a preferred value obtained from a third-party service, the maximum value, and the incremental value, wherein the first token value indicates a maximum amount of source tokens that is capable of being converted into a predetermined amount of target tokens in another collection, wherein the first token value is greater than the preferred value, and determining other collections that indicate a proposal to convert the target token into a source token for an amount less than or equal to the token value; and generating a first conversion itinerary, based on first token values and proposals of other collections, wherein the first conversion itinerary indicates the most optimal set of conversions to perform with respect to the other collections, such that source tokens and target tokens corresponding to active token pairs fall within the ideal allocation range.

The source urgency value is represented by the following equation:

$$\text{source urgency value} = \frac{\text{current allocation value} - \text{ideal allocation value}}{\text{allocation tolerance value}} \quad (1)$$

The target urgency value is represented by the following equation:

$$\text{target urgency value} = \frac{\text{ideal allocation value} - \text{current allocation value}}{\text{allocation tolerance value}} \quad (2)$$

The urgency value is represented by the following equation:

$$\text{urgency value} = \min\{\text{source urgency}, \text{target urgency}\} \quad (3)$$

The first token value is represented by the following equation:

$$\text{first token value} = \min\{[\text{urgency value} - 1] \times \text{incremental value}, \text{maximum value}\} \quad (4)$$

The second token value is represented by the following equation:

$$\text{second token value} = [1 - \text{urgency value}] \times \text{decremental value} \quad (5)$$

The present disclosure, in another aspect, features a computerized method for automatic rebalancing of tokens in a token collection. The method comprises managing a token collection that includes two or more tokens, wherein a current amount of each of the two or more tokens is associated with a current allocation value; receiving instructions that includes a maximum value, an incremental value and an ideal allocation range for each of the two or more tokens, wherein the ideal allocation includes a range of values defined by an ideal allocation value having a tolerance specified by an allocation tolerance value, and wherein tokens whose amount is to be increased to fall within the ideal allocation range are assigned to a source group, tokens whose amount is to be decreased to fall within the ideal allocation range, and tokens whose amount remains within the ideal allocation range are assigned to both the source group and the target group; determining, for each possible token pair, an urgency value determined based on a source urgency value and a target urgency value, wherein each token pair includes a source token from the source group and a target token from the target group, and wherein a source urgency value is determined for the source token based on a corresponding current allocation value, ideal allocation value, and allocation tolerance value, and wherein a target urgency value is determined for the target token based on a corresponding current allocation value, ideal allocation value, and allocation tolerance value; and for each token pair having an urgency value that is greater than an urgency threshold, determining a first token value for the target token based on a preferred value obtained from a third-party service, the maximum value, and the incremental value, wherein the first token value indicates a maximum amount of source tokens that is capable of being converted into a predetermined amount of target tokens in another collection, wherein the first token value is greater than the preferred value, and determining other collections that indicate a proposal to convert the target token into a source token for an amount less than or equal to the token value; and generating a first conversion itinerary, based on first token values and proposals of other collections, wherein the first conversion itinerary indicates the most optimal set of conversions to perform with respect to the other collections, such that source tokens and target tokens corresponding to active token pairs fall within the ideal allocation range.

The two or more tokens are assets on a blockchain, in which each conversion performed according to the first conversion itinerary is recorded on the blockchain. The allocation tolerance value includes an initial tolerance value and a final tolerance value, in which the initial tolerance value is decreased until it reaches the final tolerance value, and wherein the initial tolerance value is greater than the final tolerance value. The computerized method of claim 16, wherein the tolerance adjustment value is determined based on a current allocation tolerance value, a tolerance adjustment rate, a current block index of the blockchain and a last updated block index of the blockchain, and wherein the current allocation tolerance value is the initial tolerance value or the tolerance adjustment value, which is a value between the initial tolerance value and the final tolerance value. The tolerance adjustment rate is a predetermined value adjusted by an entity managing the token collection. The initial tolerance value is represented by the following equation:

$$\text{initial tolerance value} = \text{abs}\{\text{ideal allocation value} - \text{current allocation value}\} \quad (6)$$

The tolerance adjustment value is represented by the following equation:

$$\text{tolerance adjustment value} = \max\{\text{current tolerance value} - \text{tolerance adjustment rate} \times (\text{current block index} - \text{last updated block index}), \text{final tolerance value}\} \quad (7)$$

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 8 is an example of a diagram illustrating the feature of a user interface for allowing a user (e.g., administrator) to rebalance tokens in a container.

DETAILED DESCRIPTION

Figure 1:
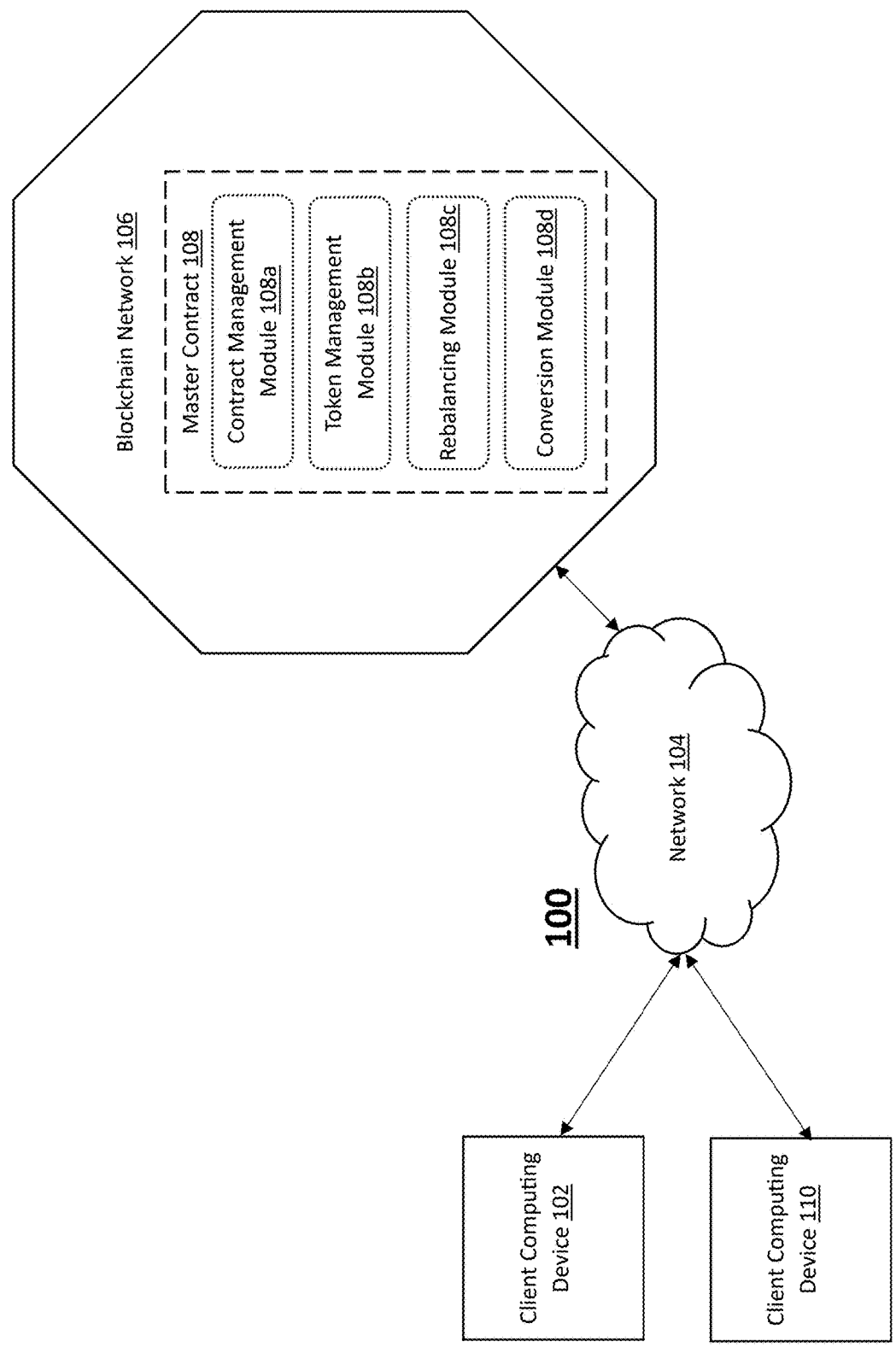
FIG. 1 is a block diagram of a system for preventing money laundering using a master contract.

In describing preferred embodiments illustrated in the drawings, specific terminology is employed herein for the sake of clarity. However, this disclosure is not intended to be limited to the specific terminology so selected and it is to be understood that each specific element includes all technical equivalents that operate in a similar manner. In addition, a detailed description of known functions and configurations is omitted from this specification when it may obscure the inventive aspects described herein.

Various tools are discussed herein to facilitate the invention(s) disclosed herein. It should be appreciated by those skilled in the art that any one or more of such tools may be embedded in the application and/or in any of various other ways, and thus while various examples are discussed herein, the inventive aspects of this disclosure are not limited to such examples described herein.

FIG. 1 is a block diagram of a system 100, which includes a client computing device 102, a communication network 104, a blockchain network 106, and a client computing device 110.

The client computing device 102 (or client computing device 110) can be coupled to a display device (not shown), such as a monitor, display panel, or screen. For example, client computing device 102 (or client computing device 110) can provide a graphical user interface (GUI) via the display device to a user of corresponding device that presents output resulting from the methods and systems described herein and receives input from the user for further processing. Further, the client computing device 102 (or client computing device 110), may include one or more applications that provide additional functionality to the client computing device 102 (or client computing device 110). For example, the client computing device 102 (or client computing device 110) may include a browser application that allows access to the services provided by devices on system 100, via a website, which can be reached by entering a uniform resource locator (URL). Exemplary client computing device 102 (or client computing device 110) include but are not limited to desktop computers, laptop computers, tablets, mobile devices, smartphones, smart watches, Internet-of-Things (IoT) devices, and internet appliances. It should be appreciated that other types of client computing devices that are capable of connecting to components of the system 100 can be used without departing from the scope of invention. Although FIG. 1 depicts a single client computing device 102 (or client computing device 110), it should be appreciated that system 100 can include any number of client computing devices 102 (or client computing device 110).

The communication network 104 can be a local area network, a wide area network, a cellular network, or any type of network such as an intranet, an extranet (for example, to provide controlled access to external users, for example through the Internet), a private or public cloud network, the Internet, etc., or a combination thereof. In addition, the communication network 104 preferably uses TCP/IP (Transmission Control Protocol/Internet Protocol), but other protocols such as SNMP (Simple Network Management Protocol) and HTTP (Hypertext Transfer Protocol)

can also be used. In some embodiments, the communication network 104 is comprised of several discrete networks and/or sub-networks (e.g., cellular to Internet).

Figure 12:
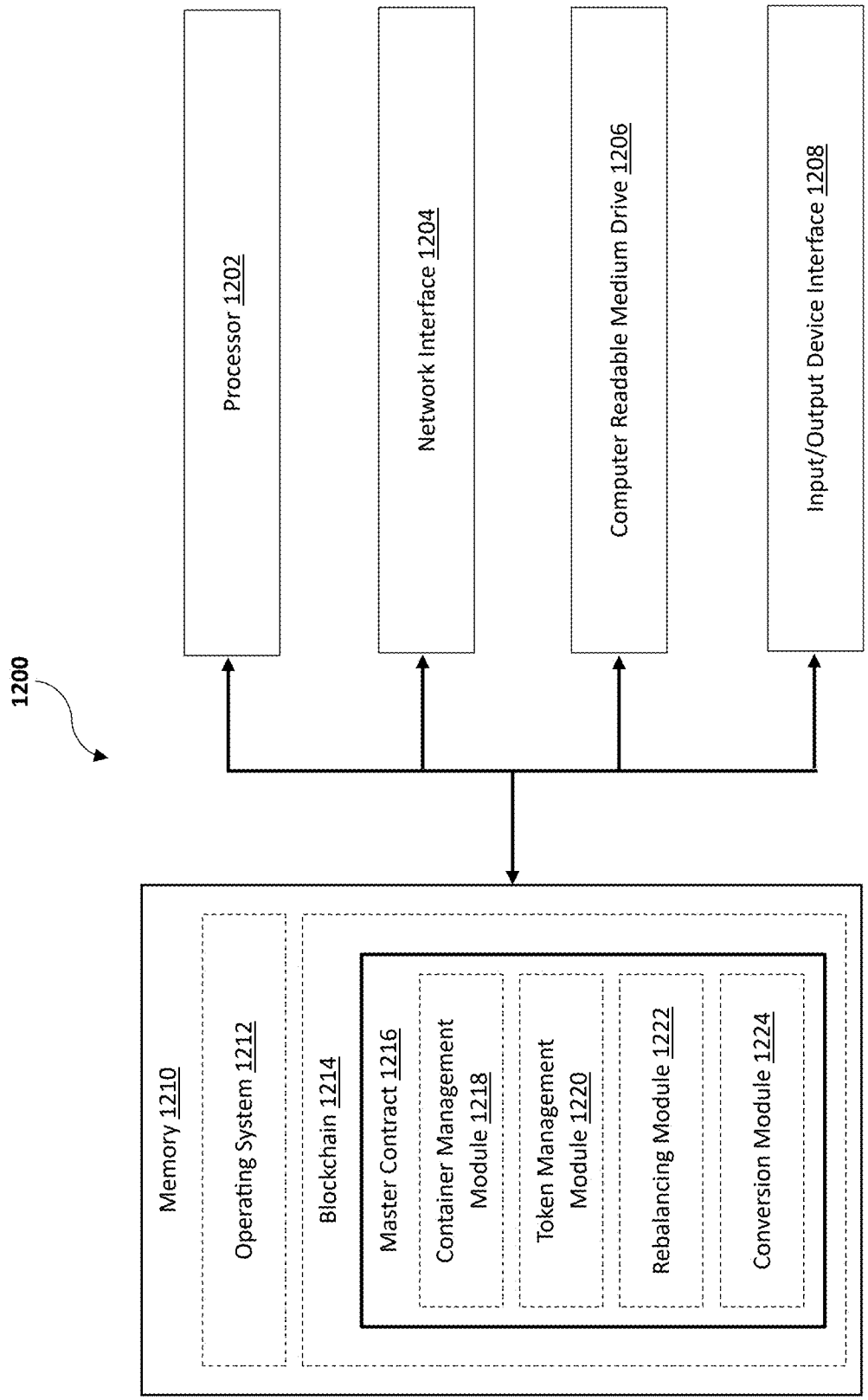
FIG. 12 is a diagram of an illustrative computing system representing an example of a node in a blockchain.

The blockchain network 106 is a network that may be a decentralized and distributed database that maintains a continuously growing list of ordered records, in the form of blocks (e.g., public ledger) that are linked using cryptography. Each block may contain a cryptographic hash of the previous block, a timestamp, and transaction data. The block cannot be altered retroactively without the alteration of all subsequent blocks and the consensus of the network. The blockchain network 106 may further include one or more nodes (e.g., computing devices) that each store a complete copy of the blockchain. An example of a computing device that operates as a node is shown in FIG. 12. In some embodiments, the node may operate as miner, in which the miner may be responsible for adding new blocks to the existing blockchain. When such event occurs, the one or more nodes are updated to reflect the new block in the blockchain. For example, the blockchain network includes at least one of Ethereum, Bitcoin, Binance Smart Contract, Cardano, Solana, Avalanche, and Tron.

A node computing device operating as a node in the blockchain may be a device including specialized hardware and/or software modules that execute on a processor and interact with memory modules of the node computing device, to transmit data to other components of the system, to receive data from other components of the system 100, as described herein. The node computing device includes several systems, frameworks, stores, and computing modules that execute on one or more processors of the node computing device.

A node computing device may be part of the blockchain network 106 that includes a master contract 108. For example, the master contract 108 includes a contract management module 108a, a token management module 108b, a rebalancing module 108c, and a conversion module 108d. In some embodiments, the token management module 108a, the token management module 108b, the rebalancing module 108c, and the conversion module 108d are specialized sets of computer software instructions programmed onto one or more dedicated processors in a node computing device and can include specifically-designated memory locations and/or registers for executing the specialized computer software instructions.

Although the contract management module 108a, module 108a, the token management module 108b, the rebalancing module 108c, and the conversion module 108d may execute within the same node computing device, in some embodiments the functionality of the contract management module 108a can be distributed among a plurality of server computing devices (e.g., cloud acting as node). It should be noted that the master contract 108 allows the contract management module 108a, the token management module 108b, the rebalancing module 108c, and the conversion module 108d to communicate with each other in order to exchange data for the purpose of performing the described functions.

It should be appreciated that any number of computing devices, arranged in a variety of architectures, resources, and configurations (e.g., cluster computing, visual computing, cloud computing) can be used without departing from the scope of the invention. Exemplary functionality of the contract management module 108a, module 108a, the token management module 108b, the rebalancing module 108c, and the conversion module 108d are described in detail below.

Example Routine for Generating Master Contract

When a routine described herein (i.e., 200, 400, 700, and 1000) is initiated, as set of executable program instructions stored on one or more non-transitory computer-readable media (e.g., hard drive, flash memory, removable media, etc.) may be loaded into memory (e.g., random access memory or RAM) of a computing device, such as the computing device 1200 shown in FIG. 12, and executed by one or more processors. In some embodiments, the routine 200, 400, 700, and 1000, or portions thereof may be implemented on multiple processors, serially or in parallel.

Figure 2:
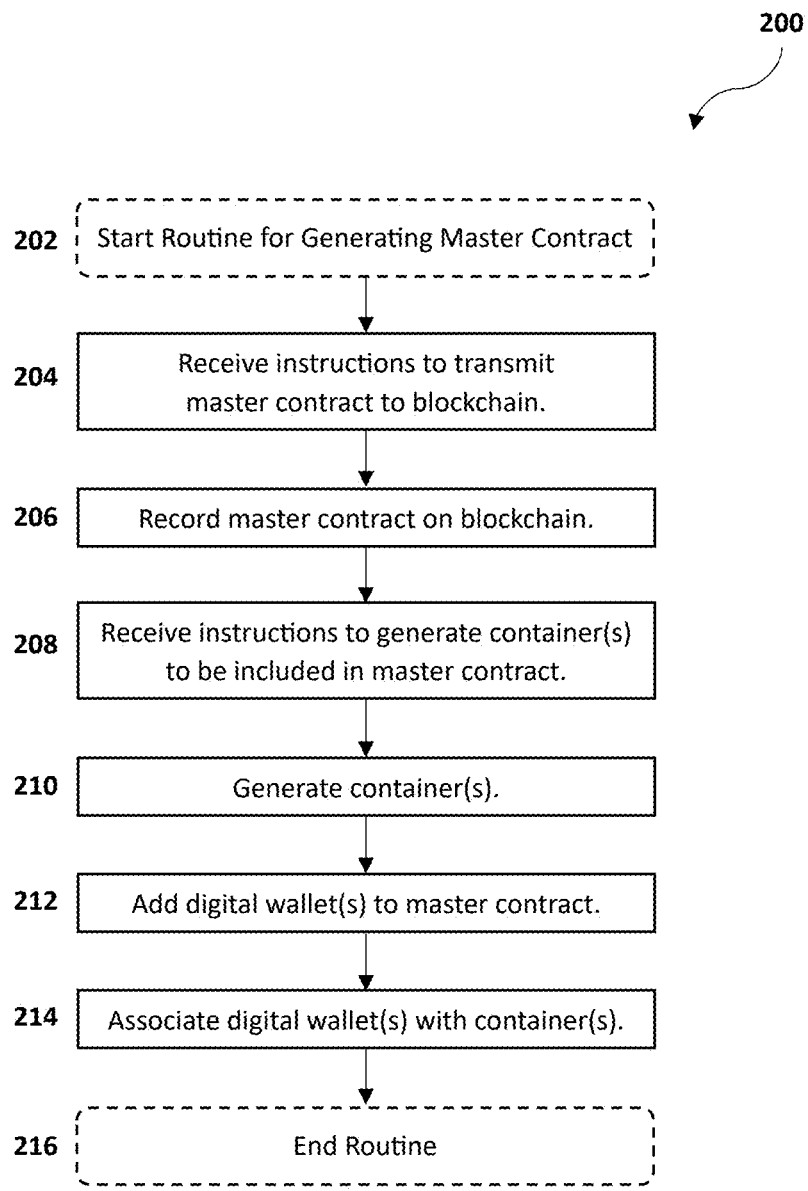
FIG. 2 is a flow diagram of a computerized method for generating a master contract.

FIG. 2 illustrates example routine 200 (beginning at block 202) for generating a master contract, that is performed, for example, by the client computing device 102, the blockchain network 108, and the contract management module 108a of the master contract 108. In some embodiments, the master smart contract (or master contract) is a smart contract that includes software or predetermined code in a programing language (e.g., Solidity, Rust, Python, Java, Vyper, etc.) that is transmitted to be stored in a blockchain (e.g., in a block on the blockchain network 108). Each node (e.g., computing device 1200 of FIG. 12) in the blockchain network 108 may be configured to run the code included in the master contract (and may also execute the smart contract). In further embodiments, the master contract stored in the blockchain network 108 may be accessible by the client computing device 102 (or the client computing device 110) via an application programming interface (API). For example, the client computing devices 102 (or the client computing device 110) may transmit instructions to the master contract via the API of the master contract.

The master contract may, for example, include one or more containers that each include one or more tokens. Tokens may represent different types of assets (e.g., cryptocurrency (e.g., Bitcoin, Ethereum, Dogecoin, etc.), crypto token, financial instruments (e.g., securities, commodities, foreign exchange, futures, and options contracts) and fiat currency), documents or image (e.g., artwork, photographs, books, videos, etc.). Further, one type of token may be capable of being converted into another type of token. Moreover, tokens may be exchanged on a blockchain, in which there may be a publicly accessible record of the tokens being exchanged from one entity to another entity. As such, in some embodiments, users (e.g., owners or holders of such tokens) may purchase one or more tokens with the expectation that a value associated with the token may increase in the future (e.g., token representing artwork increases in value as the artist becomes popular). In other embodiments, the tokens (e.g., KuCoin, NEO, Bibox) may provide dividends or interest payments for holding them. In other words, users owning such tokens may receive additional tokens in predetermined time intervals (e.g., monthly, quarterly, yearly, etc.).

The user may allow a managing entity (e.g., portfolio manager, financial advisor, etc.) to assist in selecting the tokens that may increase (or appreciate) in value in the future or that may increase the overall value of the assets (e.g., via interests or dividends), in return for paying the managing entity a fee. As such, the managing entity may, on behalf of a user, manage a portfolio (e.g., container) that includes one or more tokens. It should be noted that, while the container is being managed by the managing entity, the user may still retain some control over the container and, therefore, may be able to perform one or more actions with respect to the container (e.g., move tokens between container and digital wallet or select tokens to be rebalanced in container). Further, it should also be noted that the managing entity may manage more than one container of tokens.

At block 204, the client computing device 102 may receive instructions to transmit a master contract to the blockchain network 108. For example, the managing entity (e.g., an administrator) may cause the client computing device 102 (e.g., via an app or browser) to transmit the master contract to blockchain. The master contract is configured to include one or more containers (e.g., portfolios) that are associated with one or more users. Each of the one or more containers may include one or more tokens. In addition, the master contract may also be configured to include one or more digital wallets associated with the one or more users. For example, the digital wallets may allow users to move tokens between their digital wallets and their container (e.g., deposit or withdraw). As stated previously, an administrator may manage more than one container simultaneously (e.g., managing funds for many clients).

At block 206, the blockchain network 108 records the master contract on the blockchain. The master contract is configured (e.g., is programmed) to allow the administrator to generate, remove, and/or manage one or more containers. Further, the master contract is also configured to allow tokens to be exchanged between the containers as well as allow tokens to move between a container and the digital wallet associated with the container (as discussed supra). Likewise, in some embodiments, the master contract may also allow users to exchange tokens with each other via their digital wallets. It should be noted that the any exchange (taking place in the master contract) between containers, between digital wallets, or between containers and digital wallets may not be regarded as a blockchain transaction. In other words, when such exchanges occur, the exchanges may not necessarily be recorded in a block on the blockchain. In some embodiments, the master contract may also include an administrative wallet, which is associated with the administrator (and, by extension, the managing entity). The administrative wallet is controlled by the administrator, and may include one or more types of tokens. The master contract may allow tokens to be exchange between the administrative wallet and the containers (or digital wallets). Further, the master contract may also include a master token balance, which is a record of all tokens (e.g., token types) that are currently managed by the master contract.

At block 208, the contract management module 108*a* of the master contract 108 receives instructions to generate one or more containers for inclusion in the master contract. The containers (e.g., asset portfolio) may be associated with a user who has allowed (or requested) the managing entity to manage at least some of the assets owned by the user (e.g., tokens). As such, the container may include one or more tokens of different types. In some embodiments, the managing entity or administrator may perform a "know your customer (KYC)" check or "know your business (KYB)" check before agreeing to manage tokens held by the user. In other words, the managing entity (or administrator) may perform due diligence, which involves verifying the identity of the user (e.g., via identity card, tax documents, proof of address, etc.). In some embodiments, the administrator (and, by extension, the managing entity) is permitted by the user (associated with the container) to independently convert the tokens in the container to other tokens without any instructions from the user. In other embodiments, the users may also interact with their containers by moving tokens between their digital wallets and the container. It should also be noted that the containers in the master contract are separate from each other. In other words, each container is associated with a different user (e.g., property) and, therefore, do not mix with each other. At block 210, the contract management module 108*a* generates the containers.

At block 212, the contract management module 108*a* adds one or more digital wallets to the master contract. The digital wallets may allow the user to store tokens, exchange tokens, and view records of the tokens on (and the exchanges made using) the wallet. Further, digital wallet may be associated with a digital address, which may be a series of alphanumeric characters (e.g., hexadecimals) that is utilized when performing token exchanges. For example, the one or more digital wallets may be associated with the one or more containers. In some embodiments, the managing entity (or administrator) does not have access to the digital wallets of the users. In other words, while the managing entity (or administrator) is capable of adding or removing the digital wallet from the master contract, the managing entity (or administrator) does not have privileges with respect to managing the contents of the digital wallet. At block 214, the contract management module 108*a* associates the one or more digital wallets with their respective containers. In other words, each container is associated with a different user, in which the user is capable of moving tokens between his or her container and his or her digital wallet. In some embodiments, the digital wallet may not be inside the master contract. In other words, the digital wallet may be outside the master contract, where tokens exchanged with the outside digital wallet are performed via a blockchain. As such, it should be noted that, in the case that all of the digital wallets are outside the master contract, then block 212 may not be necessarily performed. The routine ends at block 216.

Figure 3:
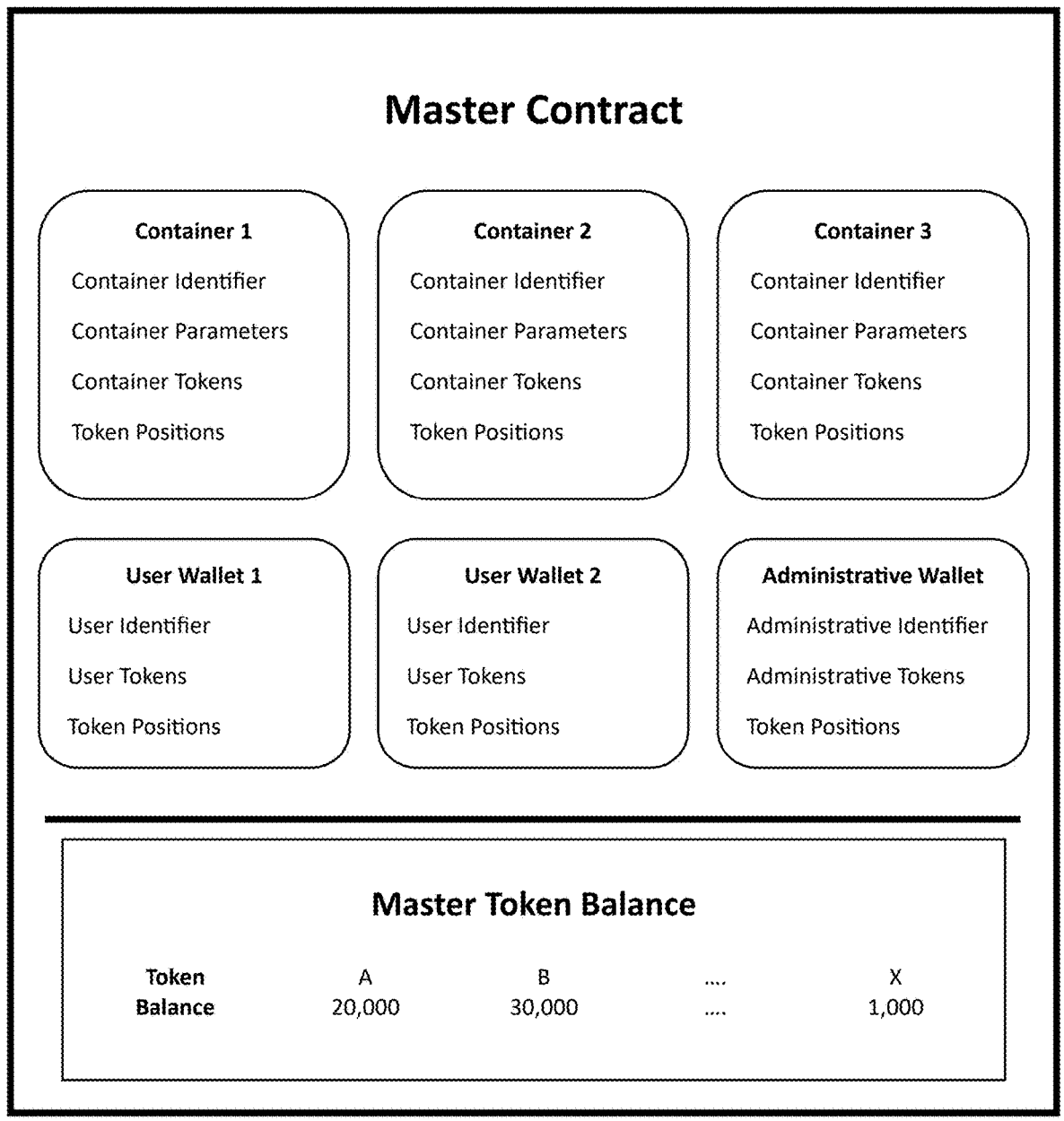
FIG. 3 is an example of a diagram illustrating the structure of a master contract.

FIG. 3 illustrates an example of a master contract, which includes one or more containers ("Container 1", "Container 2", "Container 3"), one or more digital wallets ("User Wallet 1", "User Wallet 2"), one or more administrative wallets ("Administrative Wallet"), and a master token balance ("Master Token Balance"). As shown, each container includes a container identifier, container parameters, container tokens, and token positions. The container identifier may be a unique identifier that identifies the container. The container identifier may also be used to perform exchanges with wallets on a blockchain (e.g., includes a blockchain address). The container parameters indicate the allocation range of each of the tokens currently included in the containers, and are discussed infra. The container tokens include the types of tokens included in the container, and the token positions include the balance of each token in the container. In some embodiments, the container tokens and the token position may be collectively referred to as the container balance.

Each user wallet includes a user identifier, user tokens, and token positions. The user identifier may be a unique identifier that identifies the container. The user identifier may also be used to perform exchanges with wallets on a blockchain (e.g., includes a blockchain address). The user tokens include the types of tokens included in the container, and the token positions includes the balance of each token in the user wallet. The administrative wallet may be used and operated by the managing entity (or administrator). The administrative wallet includes an administrative identifier, administrative tokens, and token positions. The administrative identifier may also be used to perform exchanges with wallets on a blockchain (e.g., includes a blockchain address). The administrative tokens include the types of tokens included in the container, and the token positions includes the balance of each token in the administrative wallet. The administrative wallet may be used by the managing entity (or administrator) to exchange tokens with the containers (e.g., containers 1, 2, 3) or the user wallets (e.g., user wallets 1, 2).

The master token balance includes the total type of tokens (e.g., token A, token B, token X) held by the master contract (e.g., tokens in both the containers, user wallets, and administrative wallets). Further, the master token balance includes the balance of each token held by the master contract (e.g., "token A: 20,000", "token B: 30,000", "token X: 1,000"). In some embodiments, the master token balance includes the total tokens in the container and the administrative wallet. In further embodiments, the managing entity may manage more than one master contract (e.g., two or more master contracts).

Example Routine for Moving Tokens Between Container and Digital Wallet

When a routine described herein (i.e., 200, 400, 700, and 1000) is initiated, as set of executable program instructions stored on one or more non-transitory computer-readable media (e.g., hard drive, flash memory, removable media, etc.) may be loaded into memory (e.g., random access memory or RAM) of a computing device, such as the computing device 1200 shown in FIG. 12, and executed by one or more processors. In some embodiments, the routine 200, 400, 700, and 1000, or portions thereof may be implemented on multiple processors, serially or in parallel.

Figure 4:
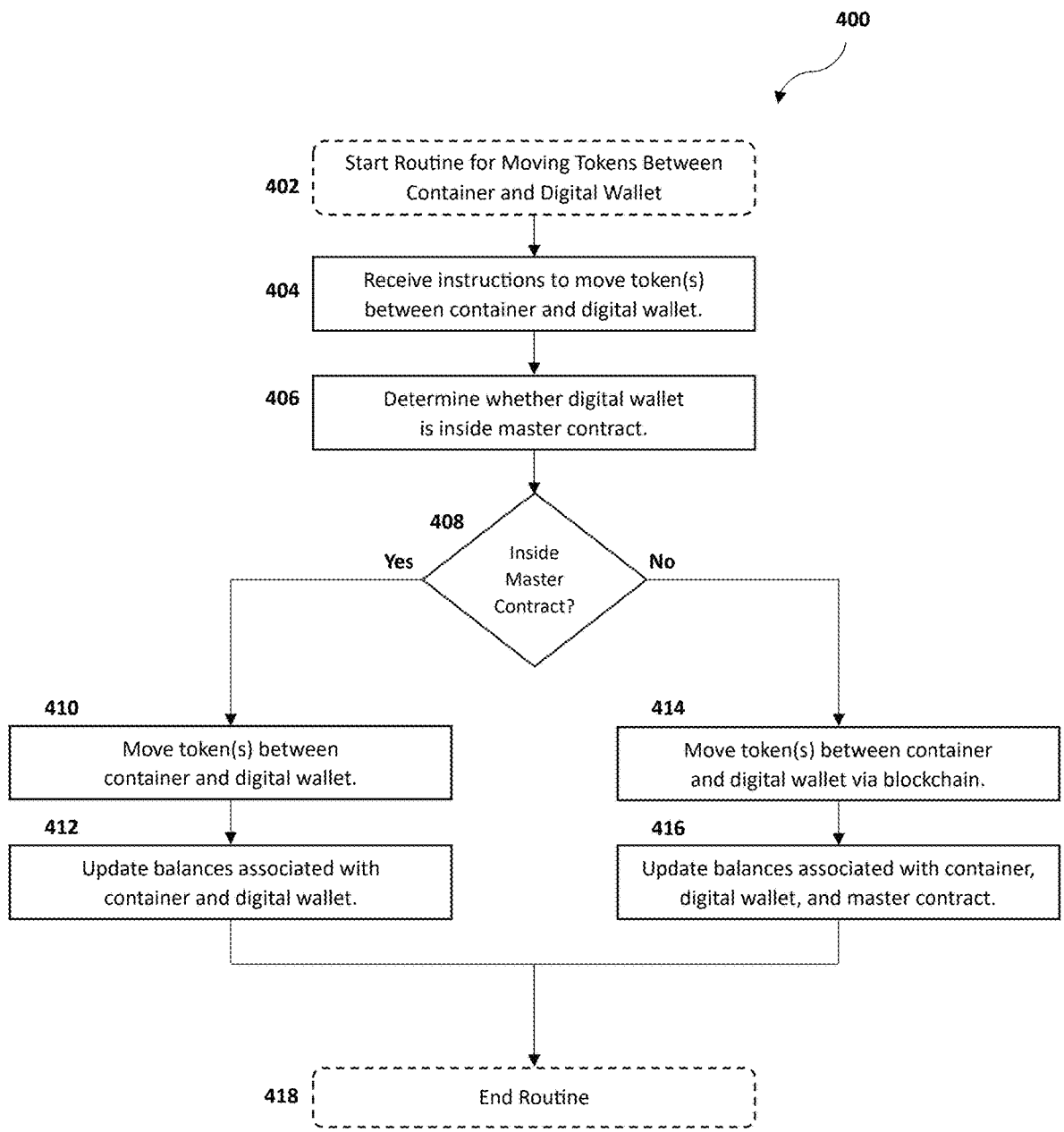
FIG. 4 is a flow diagram of a computerized method for moving tokens between a container and a digital wallet.

FIG. 4 illustrates example routine 400 (beginning at block 402) for moving tokens between a container and a digital wallet that is performed, for example, by the token management module 108b of the master contract 108. The token management module 108b may receive instructions to move one or more tokens between a container and a digital wallet. For example, the user of the digital wallet may decide to deposit tokens (from the digital wallet of the user) into the container (e.g., with the expectation that the tokens inside the container may appreciate in the future). Further, the user may utilize a digital wallet inside the master contract or a digital wallet outside the master contract to perform the movement. In another example, the user may be limited to moving tokens from their digital wallet to an associated container (e.g., associated with the user), and vice versa. In other words, the user may not be allowed to move tokens from their digital wallet to another container that is not associated with the user or move tokens from their container to another digital wallet that is not associated with the user.

It should be noted that in some embodiments, the managing entity (or the administrator) may perform a "know your customer (KYC)" check or "know your business (KYB)" check before processing movements of tokens to digital wallets that are outside the master contract. For example, the managing entity may perform such KYC or KYB check on the digital wallet to ensure that there is no fraud (e.g., scams or money-laundering) being facilitated. In another example, the managing entity (or administrator) may maintain a (white) list of digital addresses that have been cleared by KYC or KYB checks. As such, the token management module 108b may not necessarily allow movement of tokens from containers to digital wallets that have not been pre-cleared using KYC or KYB checks.

Figure 5:
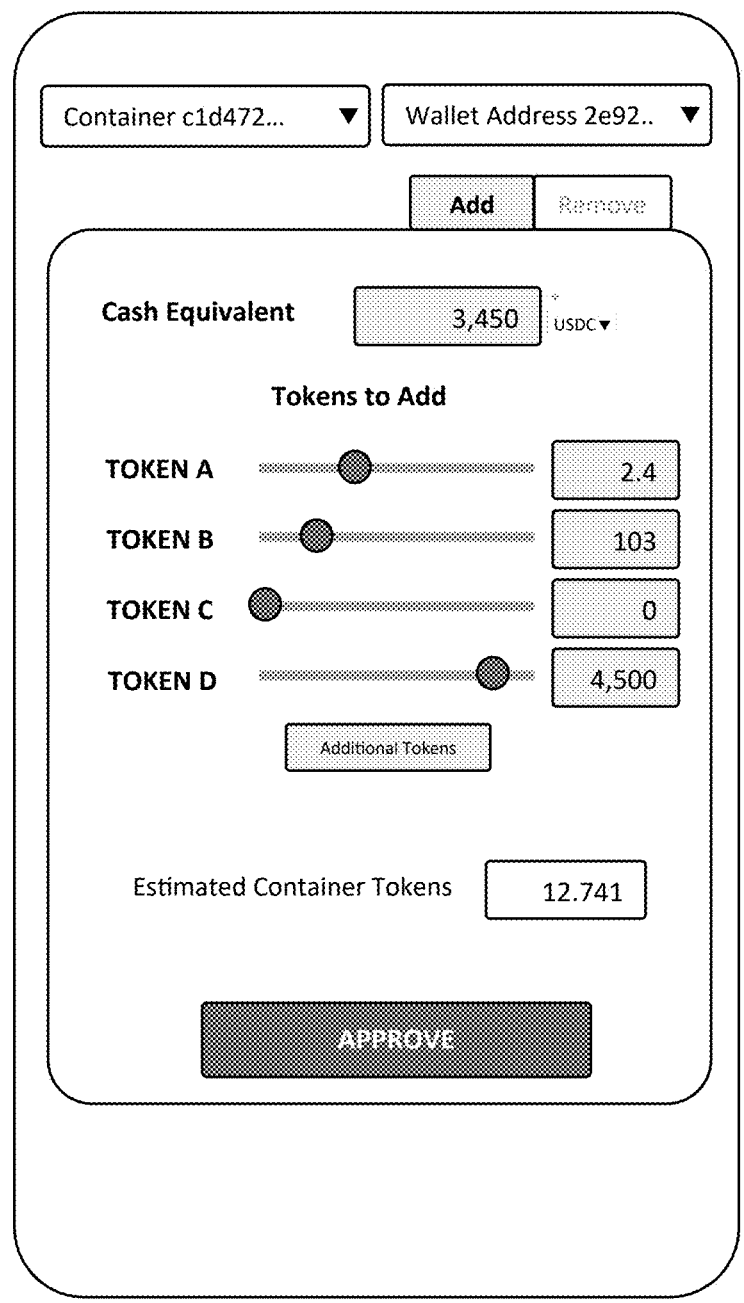
FIG. 5 is an example of a diagram illustrating the feature of a user interface for allowing a user to move tokens from a digital wallet to a container.
Figure 6:
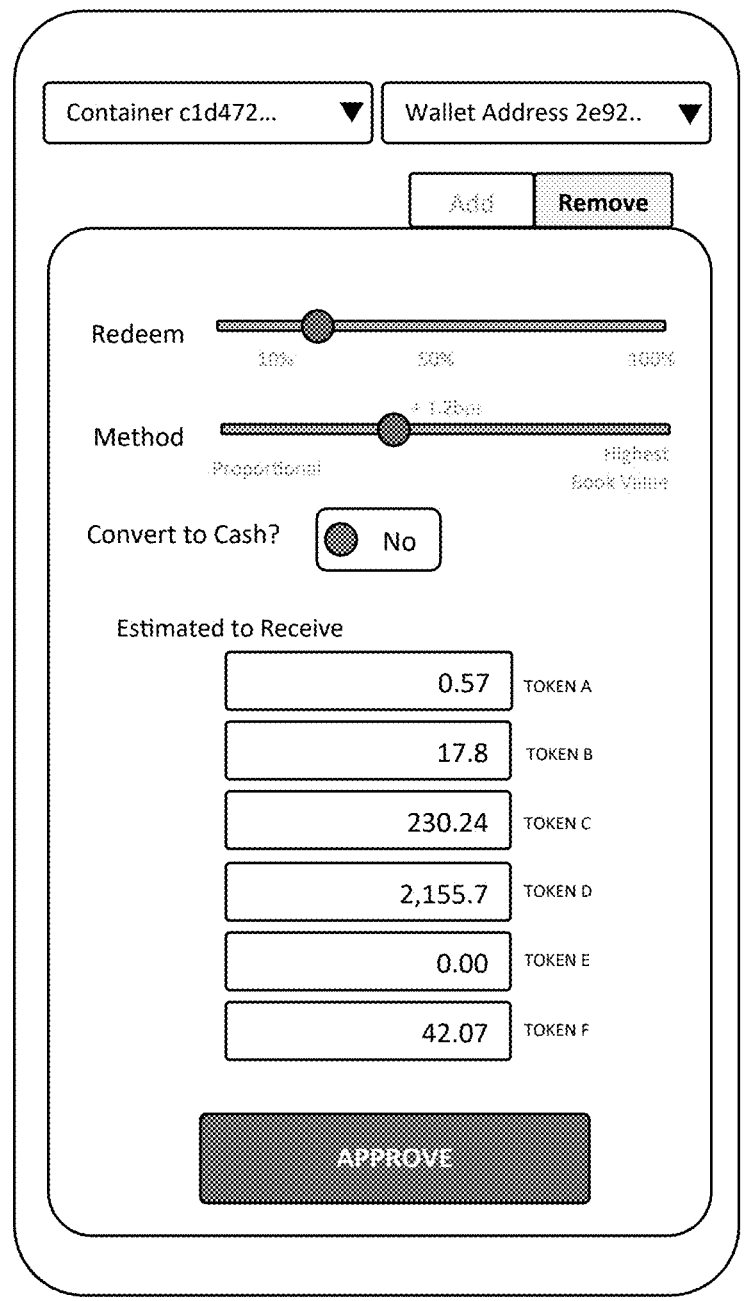
FIG. 6 is an example of a diagram illustrating the feature of a user interface for allowing a user to move tokens from a container to a digital wallet.

In some embodiments, the user may utilize an application (e.g., app or browser) on the client computing device 110 to access services provided by the master contract 108. A user interface associated with such application is shown in FIG. 5, in which the user may be moving (or adding) tokens to an associated container from a digital wallet of the user. As shown, the user is moving tokens A, B, and D (but not C) from the digital wallet associated with the user ("Wallet Address 2e92 . . . ") to an associated container ("Container cld472 . . . "). Likewise, another user interface associated with such application is shown in FIG. 6, in which the user may be moving (or withdrawing) tokens to a digital wallet of the user from an associated container. As shown, the user is moving tokens A, B, C, D, and F (but not E) from an associated container ("Container cld472 . . . ") to the digital wallet associated with the user ("Wallet Address 2e92 . . . "). In some embodiments, the token management module 108b may allow the option of converting the selected tokens (e.g., tokens A, B, C, D, and F (but not E)) into another type of asset (e.g., cash).

At block 406, the token management module 108b determines whether the digital wallet is inside the master contract or outside the master contract. In the case that the digital wallet is inside the master contract (block 408, yes), routine 400 moves to block 410. At block 410, the token management module 108b moves the tokens between the container and the digital wallet. At block 412, the token management module 108b updates balances associated with the container and the digital wallet. It should be noted that the total number of tokens inside the master contract does not change as a result of the action performed in block 410. This is because the token management module 108b is merely redistributing existing tokens to different locations without there being an increase or decrease in tokens. As a result, while the balances in the container and the digital wallet may change, the master contract balance does not change.

It should also be noted that such features allow the reduction of the possibility of fraud or money laundering because the digital wallet has already been cleared of a KYC or KYB check before being included in the master contract. Therefore, any movement of tokens between the digital wallet and the container may not be any attempt at fraud or money laundering. Further, because the movement was performed inside the master contract, it is not necessary to update the blockchain because the movement was not performed with respect to a digital address that is on the blockchain (e.g., outside the master contract). Therefore, it is not necessary to pay any fees when moving tokens between the containers and digital wallets that are both inside the master contract.

In the case that the digital wallet is not inside the master contract (block 408, no), routine 400 moves to block 414. At block 414, the token management module 108b moves the tokens between the container and the digital wallet via the blockchain. In other words, because the digital wallet is outside the master contract, the token management module 108b accesses the blockchain in order to transmit the tokens to the user via his or her digital wallet on the blockchain. At block 416, the token management module 108b updates balances associated with the container, the digital wallet, and the master contract. It should be noted that the total number of tokens inside the master contract does change as a result of the action performed in block 414. This is because the token management module 108b is interacting with entities on the blockchain, which therefore causes an increase or decrease in the amount of tokens in the master contract. As a result, the balances in the container, the digital wallet, and the master contract all change. The routine ends at 418.

Example Routine for Rebalancing Tokens

When a routine described herein (i.e., 200, 400, 700, and 1000) is initiated, as set of executable program instructions stored on one or more non-transitory computer-readable media (e.g., hard drive, flash memory, removable media, etc.) may be loaded into memory (e.g., random access memory or RAM) of a computing device, such as the computing device 1200 shown in FIG. 12, and executed by one or more processors. In some embodiments, the routine 200, 400, 700, and 1000, or portions thereof may be implemented on multiple processors, serially or in parallel.

Figure 7:
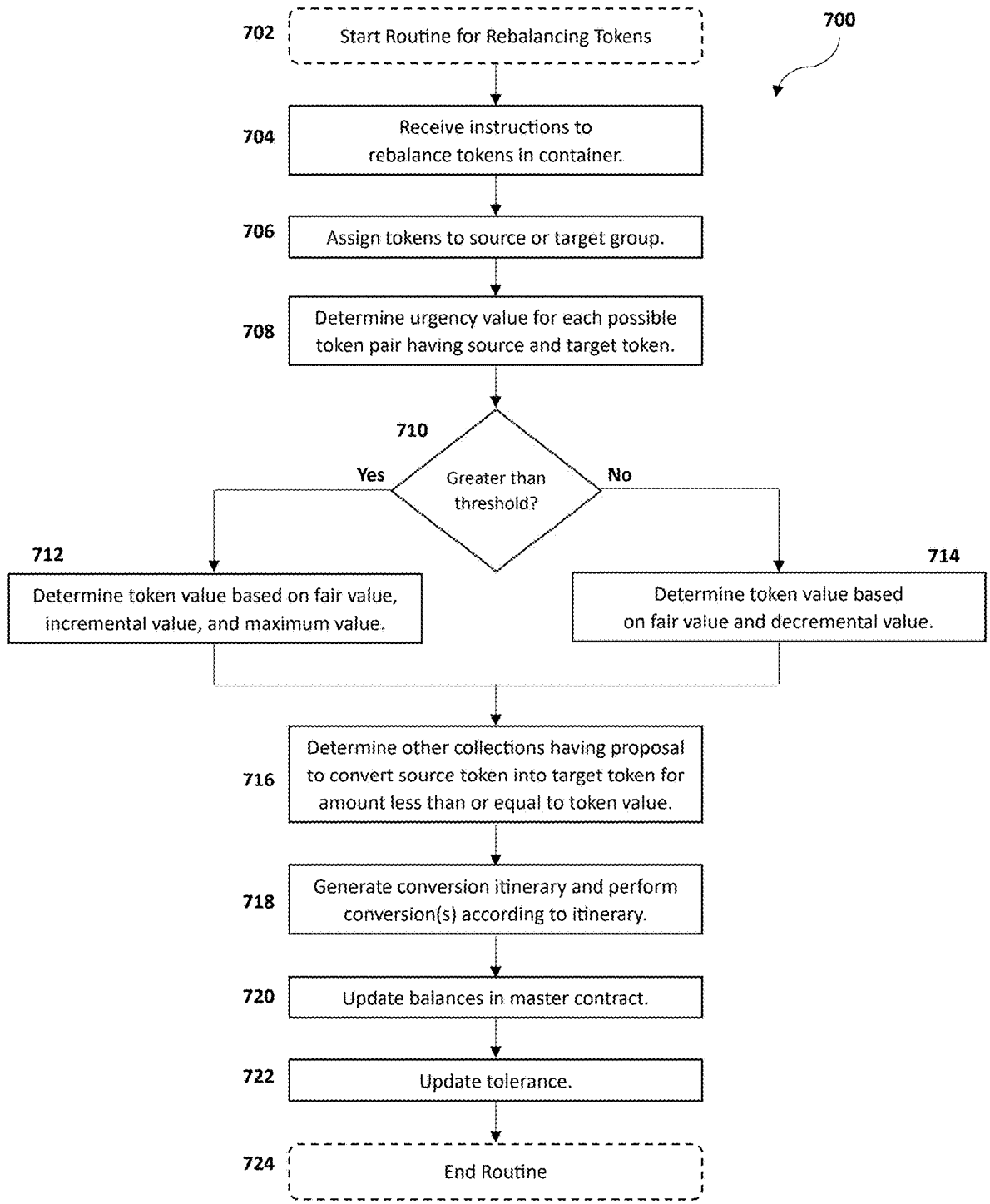
FIG. 7 is a flow diagram of a computerized method for rebalancing tokens.

FIG. 7 illustrates example routine 700 (beginning at block 702) for rebalancing tokens, that is performed, for example, by the rebalancing module 108c and the conversion module 108d of the master contract 108. At block 704, the rebalancing module 108c receives instructions to rebalance tokens in a container. As discussed previously, the managing entity (or administrator) may be managing one or more containers on behalf of one of more users. As such, the objective of the managing entity (or administrator) may be to increase the overall value of the tokens in the container. However, such task is difficult in that the value of the tokens may decrease due to, for example, low demand, overabundant supply of the tokens, or reduction in popularity (e.g., artwork by artist is no longer trending). As such, the managing entity (or administrator) may decide to rebalance the tokens in the container based on what the managing entity (or administrator) believes to increase the value of the container in the future.

For example, the administrator may utilize a user interface on the client computing device 102 to access the services provided by the master contract 108. As illustrated in FIG. 8, the administrator may be presented with a user interface that allows the administrator to facilitate changes to the contents of the container. As shown in FIG. 8, the container ("cld472 . . . . ABC Advisors Core") includes multiple tokens ("Token A", "Token B", "Token C", "Token D", "Token E"). The administrator is presented with the container parameters, which include the current allocation value of the tokens in the container, an ideal allocation value associated with each token, and an allocation tolerance value associated with each respective ideal allocation value. The current ideal allocation and the current allocation tolerance may collectively form an ideal allocation range (e.g., the ideal allocation value±the allocation tolerance). In the example provided in FIG. 8, the user is presented with the current allocation value of the tokens in the container, a current ideal allocation value associated with each token, and a current allocation tolerance value associated with each respective current ideal allocation value.

The current allocation value may be the current value of tokens within the container (e.g., current value may be considered with (monetary) worth of the tokens). In some embodiments, the current allocation value may be the current amount of tokens within the container (e.g., current amount may be considered the quantity of tokens). In this case, the current value (or amount) is represented as a percentage of the total value of tokens (or total number of tokens) in the container (e.g., "Token A: 11.5%"). The current ideal allocation value may be an ideal amount to increase or decrease the token (e.g., "Token A: 1%"). The current allocation tolerance value may be the maximum amount from which the amount of token in the container is allowed to diverge (e.g., the amount of token A should not exceed 11% or be less than 9%, since the current ideal allocation value is 10% and the current allocation tolerance is 1%). The current ideal allocation and the current allocation tolerance may collectively form a current ideal allocation range (e.g., the current ideal allocation value±the current allocation tolerance.

However, the administrator may believe that the current allocation value of tokens in the container may not necessarily be the most optimal. In other words, the administrator, for example, may believe that some of the tokens in the container may fail to appreciate in value in the future or that some of the tokens in the container may appreciate in value in the future. As such, the administrator may facilitate adjustments to the number of tokens in the container to perform rebalancing. For example, the administrator may determine a new ideal allocation range for each of the tokens, which includes a new ideal allocation value (e.g., "Token C: 5%") as well as a corresponding new allocation tolerance value (e.g., "Token C: 1%"). In addition, the administrator may also input an incremental value, decremental value, and a maximum value to assist in determining a value of a token, all which is explained in detail infra.

At block 706, the rebalancing module 108c assigns the tokens in the container to a source group or a target group based on their amount with respect to the new ideal allocation range. The rebalancing module 108c may separate the tokens into different groups due to the nature of the rebalancing. In other words, to perform rebalancing with respect to the tokens in the container, the rebalancing module 108c may convert one token to another token. For example, the rebalancing module 108c may have been instructed to obtain more token C. As such, the rebalancing module 108c may convert one of the tokens in the container to token C. However, the rebalancing module 108c cannot utilize any tokens to perform such conversion. In other words, tokens that are designated by the rebalancing module 108c to increase to fall within the ideal allocation may not be utilized because it would be counter-productive to decrease the amounts of tokens that are designated for increase.

Figure 9:
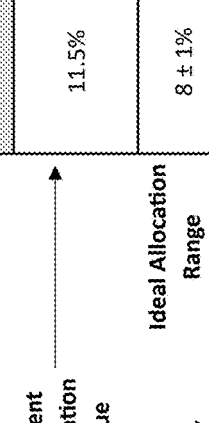
FIG. 9 is an example of a diagram illustrating tables indicating how the tokens are to be rebalanced according to their current allocation values and ideal allocation ranges.

As such, tokens that are to be decreased to fall within the ideal allocation range are designated as target tokens (e.g., "Token A") and tokens that are to be increased are designated as source tokens (e.g., "Token C", "Token D"). Tokens that remain within the new ideal allocation range (e.g., "Token B", "Token E") are designated as both source tokens and target tokens. For example, as shown in FIG. 9, the current allocation value of token A is to be decreased according to the (new) ideal allocation range from 11.5% to 8±1%. Because token A is to be decreased, token A is designated as a target token. In another example, the current allocation value of token C is to be increased according to the (new) ideal allocation range from 0.5% to 5±1%. Because token C is to be increased, token C is designated as a source token. More specifically, the target tokens refer to token types that are to be obtained from other collections by giving tokens of the source token type. For example, in FIG. 9, a possible conversion may include giving up an amount of token A to another collection (e.g., container) in exchange for an amount of C. In another example, as shown in FIG. 9, current allocation value of token B (i.e., 2%) remains in the new ideal allocation range of 5±1%

At block 708, the rebalancing module 108c determines an urgency value for each possible active token pair having a source token and a target token. More specifically, the rebalancing module 108c determines a pair including a source token and a target token that includes every possible combination of a source token and a target token. For example, as shown in FIG. 9, the source token includes token C and token D. Therefore, possible token pairs include (B, A), (B, E), (C, A), (C, B), (C, E), (D, A), (D, B), (D, E), (E, B), (E, A), and (E, B). For each token pair, a source urgency and a target urgency are determined. The source urgency is represented by the following equation:

$$\text{source urgency value} = \frac{\text{current allocation value} - \text{ideal allocation value}}{\text{allocation tolerance value}} \quad (1)$$

The target urgency value is represented by the following equation:

$$\text{target urgency value} = \frac{\text{ideal allocation value} - \text{current allocation value}}{\text{allocation tolerance value}} \quad (2)$$

Then, an urgency value is determined based on the source urgency value and the target urgency value. The urgency value is represented by the following equation:

$$\text{urgency value} = \min\{\text{source urgency, target urgency}\} \quad (3)$$

For example, in the case of a token pair comprising source token A (current allocation value: 11.5%, new ideal allocation value: 8%, new allocation tolerance value: 1%) and target token C (current allocation: 0.5%, new ideal allocation value: 5%, and new allocation tolerance value: 1%), the source urgency is determined to be 3.5 and the target urgency is determined to be 4.5. Therefore, the urgency value is 3.5.

In another example, in the case of a token pair comprising source token B (current allocation value: 2%, new ideal allocation value: 2%, new allocation tolerance value: 0.5%) and target token D (current allocation: 3.7%, new ideal allocation value: 4%, and new allocation tolerance value: 1%), the source urgency is determined to be 0 and the target urgency is determined to be 0.3. Therefore, the urgency value is 0.

In a further example, a token pair may also include token D as the source token and token B as the target token. As discussed previously, both tokens B and D can both be a source token and a target token because both are within their respective new ideal allocation range. In the case of a token pair comprising source token D (current allocation value: 3.7%, new ideal allocation value: 4%, new allocation tolerance value: 1%) and target token B (current allocation value: 2%, new ideal allocation value: 2%, and new allocation tolerance value: 0.5%), the source urgency is determined to be −0.3 and the target urgency is determined to be 0. Therefore, the urgency value is −0.3.

At block 710, the rebalancing module 108*c* determines whether the urgency value determined for each of the token pairs is greater than a predetermined urgency threshold. For example, the predetermined urgency threshold may be equivalent to 1 (one). In case that the urgency value is greater than the urgency threshold (block 710, yes), the routine 700 moves to block 712. At block 712, the rebalancing module 108*c* determines a first token value for each token pair (that is associated with an urgency value that is greater than an urgency threshold) based on a fair value, the urgency value, the incremental value, and the maximum value. The first token value is represented by the following equation:

$$\text{first token value} = \text{fair value} + \min\{[\text{urgency value} - 1] \times \text{incremental value}, \text{maximum value}\} \quad (4)$$

The fair value may be the value of the target token with respect to the source token as determined by a blockchain oracle. A blockchain oracle is a third-party service that provides information that is outside the scope of a blockchain (e.g., providing daily weather updates, or results of baseball or hockey games). As such, the master contract may be configured to interact with a blockchain oracle that provides valuation or appraisal services with respect to tokens. In some embodiments, the blockchain oracle may be provided by an exchange that facilitates the exchange of tokens. As such, the blockchain oracle is capable of providing a fair value of the token to the rebalancing module 108*c*. In some embodiments, the fair value corresponds to the market value of the token as determined by the market. The incremental value and the maximum value are used with respect to equation (4), in which both the incremental value and the maximum value determine the limits in determining how much higher than the fair value that the container is willing to provide in exchange for the target token.

Continuing from the previous example of determining an urgency value for a token pair comprising token A as a source token and token C as a target token, it was determined that the urgency value for such token pair was 3.5. Further, as shown in FIG. 8, the incremental value may be 2 and the maximum value may be 10. Therefore, the token value is the fair value+5. In some embodiments, the 5 may have basis points as a unit. As such, in the case that the fair value is determined to be 100 (i.e., 100 source coins can be exchanged for 1 target coin), then the token value is 100.05. In other words, for example, the container is willing to provide 100.05 source tokens in exchange for 1 (a single) target token.

In case that the urgency value is less than or equal to the urgency threshold (block 710, no), the routine 700 moves to block 712. At block 714, the rebalancing module 108*c* determines a second token value for each token pair (that is associated with an urgency value that is less than or equal to an urgency threshold) based on a fair value and the decremental value. The second token value is represented by the following equation:

$$\text{second token value} = \text{fair value} - ([1 - \text{urgency value}] \times \text{decremental value}) \quad (5)$$

Continuing from the previous example of determining an urgency value for a token pair comprising token B as a source token and token D as a target token, it was determined that the urgency value for such token pair was 0. Further, as shown in FIG. 8, the decremental value may be 3. Therefore, the token value is the fair value−3. In some embodiments, the 3 may have basis points as a unit. As such, in the case that the fair value is determined to be 100 (i.e., 100 source coins can be exchanged for 1 target coin), then the token value is 99.97. In other words, for example, the container is willing to provide 99.97 source tokens in exchange for 1 (a single) target token.

Likewise, continuing from the previous example of determining an urgency value for a token pair comprising token D as a source token and token B as a target token, it was determined that the urgency value for such token pair was −0.3. Further, as shown in FIG. 8, the decremental value may be 3. Therefore, the token value is the fair value−3.9. In some embodiments, the 3 may have basis points as a unit. As such, in the case that the fair value is determined to be 100 (i.e., 100 source coins can be exchanged for 1 target coin), then the token value is 99.97. In other words, for example, the container is willing to provide 99.961 source tokens in exchange for 1 (a single) target token.

At block 716, the conversion module 108*d* determines other collections that indicate proposals to convert the target token into a source token for an amount less than or equal to at least one of the first token value and the second token value. In other words, the rebalancing module 108*c* may search for collections (e.g., containers) that are included in the master contract for containers that are willing (or have existing proposals) to exchange the target token for an amount equivalent or less than the token value. It should be noted that the rebalancing module 108*c* may also have performed rebalancing with respect to such containers. In some embodiments, the managing entity may manage more than one master contract. Therefore, the rebalancing module 108*c* may also search for containers in other master contracts as well. In other embodiments, the managing entity may also be a provider of the target token to the container via the administrative wallet managed by the managing entity. Likewise, the administrative wallet may also include one or more rules that allow it to exchange tokens based on its own determination of a token value for one or more tokens included in the master contract. It should be noted that there may be multiple containers that can provide target tokens according to the proposed token value. As such, the rebalancing module 108*c* may select the container that is willing to exchange the most amount of target tokens for the least amount of source tokens.

At block 718, the conversion module 108*d* generates a conversion itinerary and performs the conversions according to the conversion itinerary. The conversion itinerary is a list of one or more conversions or exchanges based on the determination (e.g., in block 716) of the other collections that have proposal to convert target tokens into source tokens for amount less than or equal to token value. At block 720, the rebalancing module 108*c* updates balances in the master contract. It should be noted that the total number of tokens inside the master contract may not change as a result of the action performed in block 718 in case the exchange was performed with respect to another collection (e.g., container) in the master contract. This is because the rebalancing module 108*c* is merely redistributing existing tokens to different locations (e.g., collections, containers) without there being an increase or decrease in tokens in the master contract. As a result, while the balances in each of the containers may change, the master contract balance does not change.

It should also be noted that such features allow the reduction of the possibility of fraud or money laundering because both containers are within the master contract. Therefore, any movement of tokens between the two containers may not be any attempt at fraud or money laundering. Further, because the movement was performed inside the master contract, it is not necessary to update the blockchain because the movement was not performed with respect to a digital address that is on the blockchain (e.g., outside the master contract). Therefore, it is not necessary to pay any fees when moving tokens between the containers and digital wallets that are both inside the master contract.

At block 722, the rebalancing module 108*c*, updates the allocation tolerance for each source token in the token pair. For example, the allocation tolerance may be decreased by a predetermined amount at a predetermined time interval. In some embodiments, the new allocation tolerance may be an initial tolerance value that decreases over time or depending on events occurring. The initial tolerance value is represented by the following equation:

$$\text{initial tolerance value} = \text{abs}\{\text{ideal allocation value} - \text{current allocation value}\} \quad (6)$$

By setting the initial tolerance value, the container is capable of using fair value (without increasing beyond the value of the fair value) initially, and then gradually lower the allocation tolerance value to encourage entities (e.g., liquidity takers) to adjust their collections (e.g., portfolios, containers) accordingly. The initial tolerance value may be decreased by a tolerance adjustment value until the initial tolerance value is no longer greater than a final tolerance value. In some embodiments, the initial tolerance value may be set by the managing entity. In some embodiments, a final tolerance value may be set by the managing entity (or the administrator). Such adjustments may be performed each time an exchange or conversion occurs. In some embodiments, the administrator (or managing entity) may determine the tolerance adjustment value. In some embodiments, the rebalancing module 108*d* may still automatically and/or continuously perform one or more of the actions described in block 706-710, 712, and 716-722 until each token in the container falls within the new ideal allocation range. The routine ends at 724.

It should be noted that in the case that all the tokens have been rebalanced to fall within the new ideal allocation range, the rebalancing module 108*d* may still perform one or more of the actions described in blocks 706-710, 714, and 716-722 (e.g., automatically, continuously, and/or periodically). This is because, as discussed previously, tokens that are within the ideal allocation range can be converted into each other, as shown by the example of token B and token D, in which both token B and token D can be considered as both a source token and a target token. In other words, a container can generate "profit" (or passive income) from existing coins by merely exchanging tokens that are already in the ideal allocation range, since the conversion of coins happen when the token value of the target token with respect to the source token is below the fair value (e.g., 99.961 source tokens in exchange for 1 (a single) target token). As such, one or more of the actions described in blocks 706-710, 714, and 716-722 can be performed continuously (e.g., by the rebalancing module 108*d*) without any user (or administrator) interaction. As such, the master contract (e.g., via the rebalancing module 108*d*) can cause the container to automatically generate a continuous stream of tokens as profit (or passive income) without anyone noticing (e.g., set it and forget it). In some embodiments, the rebalancing module 108*d* may generate such "passive income" after each token in the container is within the ideal allocation range. In some embodiments, the master contract can cause the container to automatically generate a continuous stream of tokens as profit (or passive income) until new instructions are received that includes a new maximum value, a new incremental value, and a new ideal allocation range for each of the tokens in the master contract.

Example Routine for Converting Tokens

When a routine described herein (i.e., 200, 400, 700, and 1000) is initiated, as set of executable program instructions stored on one or more non-transitory computer-readable media (e.g., hard drive, flash memory, removable media, etc.) may be loaded into memory (e.g., random access memory or RAM) of a computing device, such as the computing device 1200 shown in FIG. 12, and executed by one or more processors. In some embodiments, the routine 200, 400, 700, and 1000, or portions thereof may be implemented on multiple processors, serially or in parallel.

Figure 10:
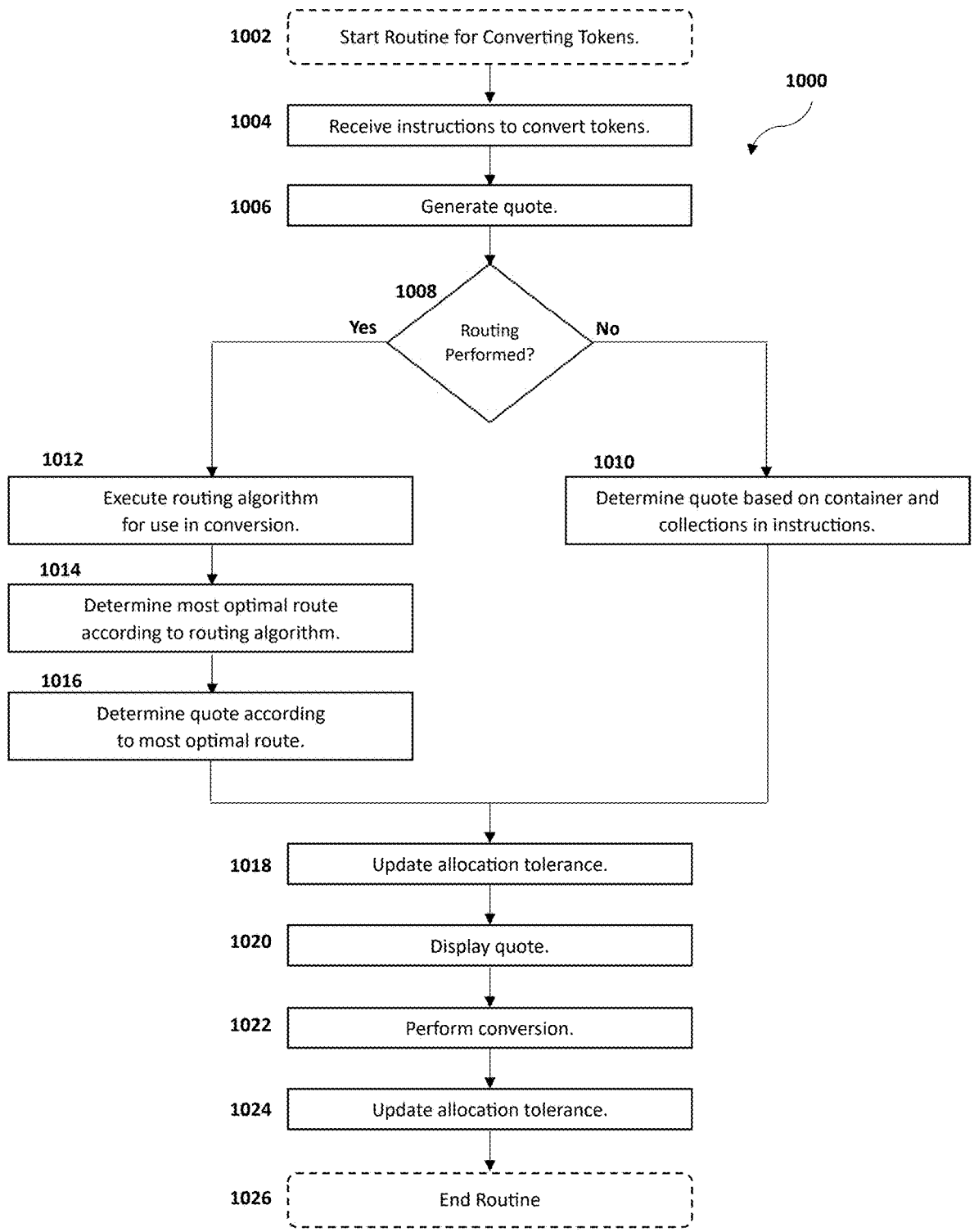
FIG. 10 is a flow diagram of a computerized method for converting tokens.
Figure 11:
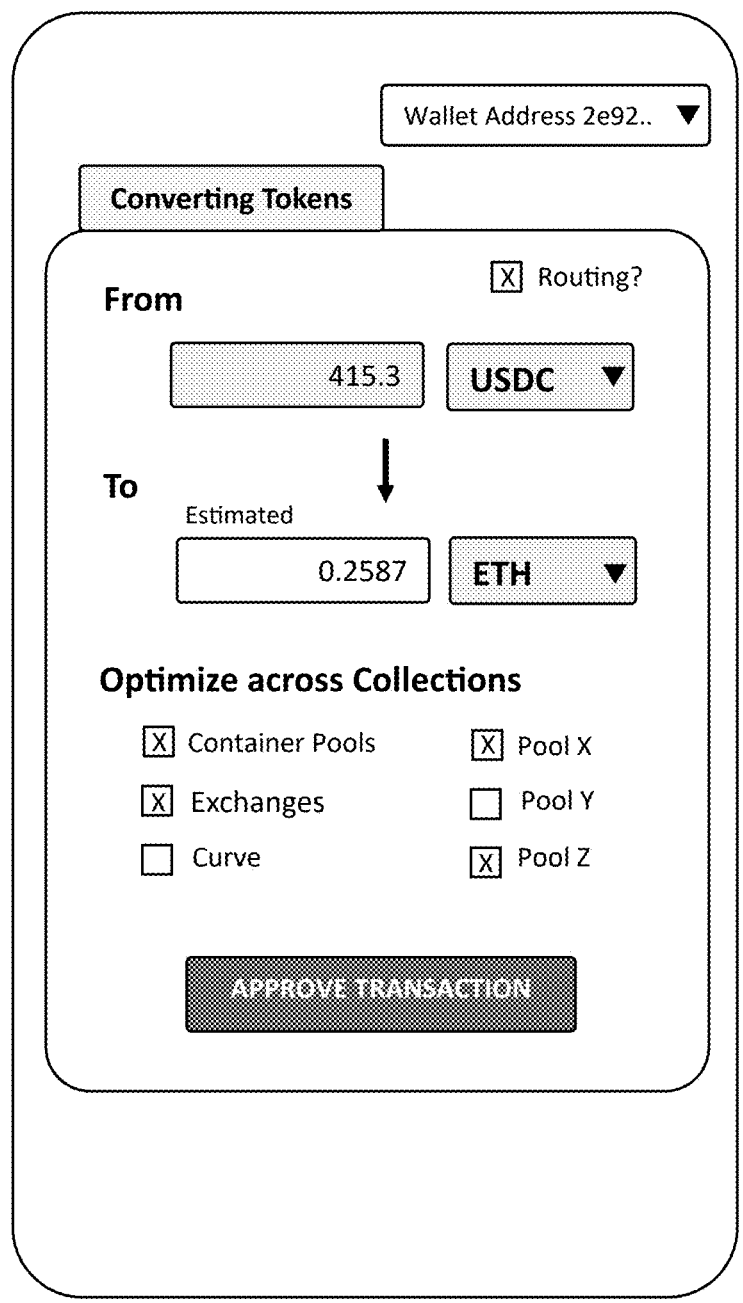
FIG. 11 is an example of a diagram illustrating the feature of a user interface for allowing a user to perform a conversion of tokens with one or more collections.

FIG. 10 illustrates example routine 1000 (beginning at block 1002) for rebalancing tokens, that is performed, for example, by the rebalancing module 108*c* and the conversion module 108*d*. At block 1004, the rebalancing module 108c receives instructions to rebalance tokens in a container (e.g., receive instructions from the rebalancing module 108c). For example, the instructions may come from a user operating the computing device 110. As shown in FIG. 11, the user may be presented with a user interface that allows the user to select the type of token to convert (e.g., USDC (USD Coin) to ETH (Ethereum)). Further, the user may also select which collections (e.g., containers, digital wallets, exchanges) with which the user wishes to exchange (e.g., "Container Pools", "Exchanges", "Curve", "Pool X", "Pool Y", "Pool Z").

For example, the "Container Pools" may be one or more containers that are included in the same master contract as the container of the user. In another example, the "Container Pools" may include containers in another master contract. In a further example, the market exchanges are organized markets where one or more tokens can be purchased and sold. In some embodiments, the market exchanges are decentralized exchanges. Examples of market exchanges (or operators of market exchanges) include, but are not limited to, Coinbase, Binance, and Kraken. Such market exchanges may allow parties (e.g., users of the computing devices 110) to exchange assets with each other (e.g., communicate with the market exchange via a web browser or an app associated with the market exchange). For example, the market exchange may allow a first party to indicate their terms (or conditions) for exchanging an asset on an exchange platform (e.g., proposals). A second party may view such terms as acceptable, and may proceed to perform a conversion according to such terms. In some cases, the first party may offer the asset passively in which the second party can accept the terms (or conditions) and perform the conversion without requiring the first party to authorize such transaction.

At block 1006, the rebalancing module 108c generates a quote. For example, the user may be presented with a quote with respect to performing the conversions (e.g., 415.3 USDC to 0.2587 ETH) on the user interface. In other words, the user may select a token (e.g., USDC), a corresponding amount (e.g., 415.3), and the token to which the user wishes to obtain (e.g., ETH). The quote may be the value of the token to which the user wishes to obtain (e.g., 0.2587 ETH). In some embodiments, the quote is the fair value obtained from an oracle.

At block 1008, the rebalancing module 108c determines whether to perform routing (e.g., smart order routing) in order to determine the quote. Routing may involve one or more conversions (collectively a route) that provides the best value for obtaining the target token for the least number of source tokens possible. As such, it may be possible to have, for example, five (5) conversions that result in a better value than a single conversion. Each route may start with the source token and end with the target token. However, the conversions in between the first and last conversion may involve tokens that are not the source token and the target token.

For example, as shown in FIG. 11, the user is presented with the option of performing routing (e.g., "Routing?"). As such, in the case the rebalancing module 108c determines that the user does not wish to perform routing (block 1008, no), the routine 1000 moves to block 1010. At block 1010, the conversion module 108d determines a quote based on the container in the master contract and collections specified in the instructions (e.g., "Container Pools", "Exchanges", "Pool X" and "Pool Z"). For example, the quote may be obtained by performing the actions in blocks 708, 710, and 712 (or 714). In other words, an urgency value is determined for the source token (e.g., USDC) and the target token (e.g., ETH) by using equations (1)-(3) based upon the container parameters (e.g., current allocation value, ideal allocation value, allocation tolerance value) associated with the container of the user. A first token value or a second token value is determined using equation (4) or, in the alternative, equation (5), depending on the determined urgency value. It should be noted that the quote may include the first token value (or the second token value) that is modified to account for the arbitrary number selected by the user (e.g., 415.3 USDC instead of 1 USDC).

In the case that the rebalancing module 108c determines that the user wishes to perform routing (block 1008, yes), the routine 1000 moves to block 1012. At block 1012, the conversion module 108d executes a routing algorithm (e.g., smart order routing) for use in conversion. For example, the conversion module 108d may access a database outside of the blockchain (e.g., off chain) that includes the algorithm for smart order routing. As such, the conversion module 108d may execute the routing algorithm by calling the routing algorithm. For example, the routing algorithm may cause the conversion module 108d to determine a maximum depth, and from such maximum depth, the conversion module 108d may obtain each possible route for performing the conversion. For example, the conversion module 108d may access collections in the master contract (e.g., containers, administrative wallet, or digital wallets), market exchanges (e.g., decentralized exchanges), or other pools. In some embodiments, the conversion module 108d utilizes a recursive function to determine the routes. In case the conversion module 108d determines that a route reaches the target token (but does not exceed the maximum depth), the conversion module 108d adds such route as a possible route.

At block 1014, the conversion module 108d determines the most optimal route according to the routing algorithm. To facilitate such determination, the conversion module 108d first determines the cost of each route, after determining all possible routes that reach the target token (without exceeding the maximum depth). In some embodiments, the conversion module 108d generates a percentage list (e.g., 25%, 50%, 75%, 100%) for use in determining the cost. For routes that include collections in, for example, a market exchange, the cost is determined by accessing their data via the API of the market exchange. For routes that include a container in the master contract, the cost is determined via accessing the API of the master contract. It should be noted that routes involving a container in the master contract may be associated with a time decay function. In other words, the cost of a route involving a container in the master contract may be determined based on a time decay function. In some embodiments, the conversion module 108d generates a route queue corresponding to each percentage in the percentage list that sorts the routes based on their cost. In some embodiments, the conversion module 108d utilizes breadth first search (BFS) to determine possible splits, in which each route is fitted into the split from the route queue (so that the route with the lower cost for the percentage is used first). In some embodiments, any fees (e.g., gas fees) associated with the route are added to the cost. The conversion module 108d determines the split with the lowest cost as the most optimal route. At block 1016, the conversion module 108d determines the quote according to the most optimal route. In this case, the quote corresponds to the cost of the split associated with the most optimal route.

It should be noted that each conversion performed in the most optimal route may involve performing the actions in blocks 708, 710, and 712 (or 714). In other words, an urgency value is determined for the source token and the target token in a conversion in the route by using equations (1)-(3) based upon the container parameters (e.g., current allocation value, ideal allocation value, allocation tolerance value) associated with the container of the user. A first token value or a second token value is determined using equation (4) or, in the alternative, equation (5), depending on the determined urgency value. Such aforementioned actions may be repeated from the first conversion in the route to the last conversion in the route.

At block 1018, the conversion module 108*d* updates the allocation tolerance associated with the container. For example, as discussed previously, the allocation tolerance may be decreased by a predetermined amount at a predetermined time interval. In some embodiments, the new (or current) allocation tolerance may be an initial tolerance value that decreases over time or decreases depending on events occurring. In further embodiments, a final tolerance value may be set by the managing entity (or the administrator). The initial tolerance value is represented by the following equation:

$$\text{initial tolerance value} = \text{abs}\{\text{ideal allocation value} - \text{current allocation value}\} \quad (6)$$

By setting the initial tolerance value, the container is capable of using fair value (without increasing beyond the value of the fair value) initially, and then gradually lower the allocation tolerance value to encourage entities (e.g., liquidity takers) to adjust their collections (e.g., portfolios, containers) accordingly. The initial tolerance value may be decreased by a tolerance adjustment value until the initial tolerance value is no longer greater than a final tolerance value. Such adjustments may be performed each time an exchange or conversion occurs or when a quote is generated. In some embodiments, the administrator (or managing entity) may determine the tolerance adjustment value and/or the tolerance adjustment rate. In other embodiments, the tolerance adjustment value is represented by the following equation:

$$\text{tolerance adjustment value} = \max\{\text{current tolerance value} - \text{tolerance adjustment rate} \times (\text{current block index} - \text{last updated block index}), \text{final tolerance value}\} \quad (7)$$

The tolerance adjustment value is determined based on a current allocation tolerance value, a tolerance adjustment rate, a current block index of the blockchain (e.g., of blockchain network 108), a last updated block index of the blockchain (e.g., of blockchain network 108), and the final tolerance value. The current allocation tolerance value is the initial tolerance value or a value between the initial tolerance value and the final tolerance value (based on decreasing the initial tolerance value using one or more tolerance adjustment values).

At block 1020, the rebalancing module 106*c* displays the quote on the user interface, as shown in FIG. 11. For example, in this case, the quote is 415.3 USDC to 0.2587 ETH. The user may be able to perform the conversion (assuming the user agrees to the quote) by activating the "Approve Transaction" button. At block 1022, the conversion module 106*d* performs the conversion according to the quote previously generated. At block 1024, the rebalancing module 106*c* performs another update of the allocation tolerance. Such update is described supra, and may involve equations (6) and (7). In some embodiments, one or more actions described in blocks 1012, 1014, and 1016 may be performed in place of (or in conjunction with) block 716 of routine 700 in FIG. 7. For example, such actions may be performed to determine the most optimal conversion or when there are no containers in the master contract available to make a conversion. The routine ends at block 1026.

Execution Environment

FIG. 12 illustrates various components of an example computing device 1200 configured to implement various functionality described herein.

In some embodiments, the computing device 1200 may be implemented using any of a variety of computing devices, such as server computing devices, desktop computing devices, personal computing devices, mobile computing devices, mainframe computing devices, midrange computing devices, host computing devise, or some combination thereof.

In some embodiments, the features and services provide by the computing device 1200 may be implemented as webs services consumable via one or more communication networks. In further embodiments, the computing device 1200 is provided by one or more virtual machines implemented in a hosted computing environment. The hosted computing environment may include one or more rapidly provisioned and released computing resources such as computing devices, networking devices, and/or storage devices. A hosted computing environment may also be referred to as a "cloud" computing environment.

In some embodiments, as shown, a computing device 1200 may include one or more processors 1202, such as physical central processing units ("CPUs"); one or more network interfaces 1204, such as network interface cards ("NICs"); one or more computer readable medium drives 1206, such as a high density disk ("HDDs"), solid state drives ("SSDs"), flash drives, and/or other persistent computer readable media; one or more input/output drive interfaces 1208; and one or more computer-readable memories 1210, such as random access memory ("RAM") and/or other volatile non-transitory readable media.

The one or more computer-readable memories 1210 may include computer program instructions that one or more computer processors 1202 execute and/or data that the one or more computer processors 1202 use in order to implement one or more embodiment. For example, the one or more computer-readable memories 1210 can store an operating system 1212 to provide general administration of the computing device 1200. As another example, the one or more computer-readable memories 1210 can store a blockchain 1214 (e.g., computing device 1200 is acting as a node in a blockchain, such as blockchain network 108).

In a further example, the one or more computer-readable memories 1210 can store a master contract 1216 (e.g., master contract 108), which is stored or recorded in the blockchain 1214. In an additional example, the one or more computer-readable memories 1210 can store a container management module 1218 (e.g., container management module 108*a*), which allows the generating of master contracts, containers, and the modification of such master contracts and containers (and is disposed in the master contract 1216). In yet another example, the one or more computer-readable memories 1210 can store a token management module 1220 (e.g., token management module 108*b*), which allows tokens to be moved between containers and digital wallets (and is disposed in the master contract 1216). In another example, the one or more computer-readable memories 1210 can store a rebalancing module 1222 (e.g., rebalancing module 108*c*), which allows automated rebalancing of tokens in the container (and is disposed in the master contract 1216). In a further example, the one or more computer-readable memories 1210 can store a conversion module 1224 (e.g., conversion module 101*d*), which performs conversions of tokens into other tokens, and determines the most optimal route to perform such conversions (and is disposed in the master contract 1216).

Terminology

A token may be a digital asset based upon a computer generated mathematical and/or cryptographic protocol that may, among other things, be exchanged for value and/or be used in exchanges involving goods or services. For example, tokens can represent anything from digital objects to objects in the physical world. In some embodiments, a token may be based on an open source mathematical and/or cryptographic protocol, which may exist on a blockchain network. Such blockchain network may be centralized (e.g., run by one or more central servers) or decentralized (e.g., run through a peer-to-peer network). Tokens may be maintained, tracked, and/or administered by the blockchain network.

A blockchain network may involve a decentralized electronic ledger system, which may be maintained by a plurality of physically remote computer systems. Such a ledger may be a public ledger, which may track asset ownership and/or transfers of assets (e.g., tokens) from one address to another address. The ledger may be a decentralized public ledger, which can be distributed to users in the network (e.g., via peer-to-peer sharing). Updates to the ledger may be broadcast to the users across the network. Each user may maintain an electronic copy of all or part of the ledger, as described herein. The ledger allows for authentication of each block in the blockchain. Each user transfers a digital asset (e.g., token) to the next user by digitally signing them over to the next user in a blockchain transfer which is published to and added on to a block on the blockchain. A transferee can then verify each previous transaction (e.g., by analyzing the blockchain to verify the chain of ownership).

The blockchain network may timestamp transfers by including them in the blocks that constitute the blockchain. In some embodiments, the addition of a block may occur periodically (e.g., approximately every 15 seconds, every minute, every 2.5 minutes or every 10 minutes). Such blocks may not be changed without redoing the work that was required to create each block since the modified block. The longest blockchain may serve not only as proof of the sequence of events but also records that this sequence of events was verified by a majority of the computing power of the blockchain network. The blockchain recognized by the nodes corresponding to the majority of computing power, or some other consensus mechanism, may become the accepted blockchain for the network. In some embodiments, confirmation of a transfer may be attained with a high degree of accuracy following the addition of a fixed number of blocks to the blockchain (e.g., six blocks) after a transfer was performed and first recorded on the blockchain.

There are a variety of consensus mechanisms (or protocols) that may be used to verify transactions recorded in a blockchain. Usually, such mechanisms involve one or more computer systems (e.g., miners) or pools of computer systems (e.g., mining pools) that can solve algorithmic equations allowing them to add records of recent transfers (e.g., blocks) to a chain of transfers. For example, blockchains may rely on proof of work, which is a concept used to demonstrate that a program did the work required to propose a new block for the chain, in which network consensus is reached after there is proof that the work was done without any attempts to alter data within the block. Proof of work is provided by sending the information in a block through a hashing algorithm, then adjusting variable fields until a number is reached that has a lower value than the difficulty target of the blockchain network. This serves as proof that the program expended the computational effort to "hash" the block until a solution was reached. In another example, the proof of stake protocol is another mechanism that may be implemented by blockchains. In this type of protocol, a validator's stake is represented by the amount of digital assets (e.g., tokens) held. Validators accept, reject or otherwise validate a block to be added to the blockchain based on the amount of digital assets held by the validator on the blockchain. If the validators are successful in validating and adding the block, such a protocol, in embodiments, will award successful validators are a fee in proportion to their stake.

In some embodiments, a digital asset based on a blockchain, may, in turn, include "smart contracts", which is a self-executing program that is stored (e.g., hosted) and executed on a blockchain network. Smart contracts execute automatically when one or more predetermined conditions are fulfilled without the need for intermediaries (e.g., banks, lawyers, or voting authorities). Smart contracts can also automate complex workflows by triggering the next action when certain conditions are fulfilled. Further, smart contracts can operate independently, but many decentralized applications can implement several contracts that work together to achieve certain functionalities. In some embodiments, at least one of the parties to the smart contract triggers execution of the smart contract (e.g., when such party believes that the predetermined conditions are fulfilled). In other embodiments, an oracle may be used to trigger execution of the smart contract. Due to the fact that it is possible to have one or more conditions occur outside (e.g., off chain) the scope of the blockchain (e.g., weather, sports results, etc.), smart contracts may need to determine the fulfillment of the one or more conditions via an outside service. The oracle is a third-party service with which a smart contract is programmed to communicate in order to determine whether a condition is fulfilled. Such communication can be in either direction (e.g., oracle transmits message to smart contract or smart contract transmits a request to the oracle).

It should be noted that there may be more than one type of oracle. For example, input oracles obtain data from the real-world (off chain) and transmit such data to a blockchain network for smart contract execution. In another example, output oracles allow smart contracts to transmit commands to off chain systems that to cause such systems to perform certain actions (e.g., informing a banking network to make a payment, telling a storage provider to store the supplied data, or pinging a system to unlock a car door once the on chain rental payment is made). In a further example, cross-chain oracles can read and write information between different blockchains. Cross-chain oracles enable interoperability for moving both data and assets between blockchains, such as using data on one blockchain to trigger an action on another or bridging assets cross-chain so they can be used outside the native blockchain on which they were issued. Compute-enabled oracles use secure off chain computation to provide decentralized services that are impractical to do on chain due to technical, legal, or financial constraints. For example, such oracle may be used to trigger the running of smart contracts when predefined events take place, computing zero-knowledge proofs to generate data privacy, or running a verifiable randomness function to provide a tamper-proof and provably fair source of randomness to smart contracts.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus (e.g., a programmable processor, a computer, and/or multiple computers). A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry (e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like). Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random-access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data (e.g., magnetic, magneto-optical disks, or optical disks). A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices (e.g., DRAM, SRAM, EPROM, EEPROM, and flash memory devices); magnetic disks (e.g., internal hard disks or removable disks); magneto-optical disks; and optical disks (e.g., CD, DVD, HD-DVD, and Blu-ray disks). The processor and the memory can be supplemented by and/or incorporated in special purpose logic circuitry.

To provide for interaction with a user, the above-described techniques can be implemented on a computing device in communication with a display device (e.g., a CRT (cathode ray tube), plasma, or LCD (liquid crystal display) monitor, a mobile device display or screen, a holographic device and/or projector, for displaying information to the user and a keyboard and a pointing device (e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback (e.g., visual feedback, auditory feedback, or tactile feedback; and input from the user can be received in any form, including acoustic, speech, and/or tactile input).

The above-described techniques can be implemented in a distributed computing system that includes a back-end component. The back-end component can, for example, be a data server, a middleware component, and/or an application server. The above-described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above-described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

The above-described techniques can be implemented using supervised learning and/or machine learning algorithms. Supervised learning is the machine learning task of learning a function that maps an input to an output based on example input-output pairs. It infers a function from labeled training data consisting of a set of training examples. Each example is a pair consisting of an input object and a desired output value. A supervised learning algorithm or machine learning algorithm analyzes the training data and produces an inferred function, which can be used for mapping new examples.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A system for automatic rebalancing of tokens in a token collection, the system comprising a server computing device having a memory for storing computer-executable instructions and a processor that executes the computer-executable instructions to:

manage a token collection that includes two or more tokens, wherein a current amount of each of the two or more tokens is associated with a current allocation value;

receive instructions that includes a maximum value, an incremental value and an ideal allocation range for each of the two or more tokens, wherein the ideal allocation includes a range of values defined by an ideal allocation value having a tolerance specified by an allocation tolerance value, and wherein tokens whose amount is to be increased to fall within the ideal allocation range are assigned to a source group, tokens whose amount is to be decreased to fall within the ideal allocation range are assigned to a target group, and tokens whose amount remains within the ideal allocation range are assigned to both the source group and the target group;

determine, for each possible token pair, an urgency value determined based on a source urgency value and a target urgency value, wherein each token pair includes a source token from the source group and a target token from the target group, and wherein a source urgency value is determined for the source token based on a corresponding current allocation value, ideal allocation value, and allocation tolerance value, and wherein a target urgency value is determined for the target token based on a corresponding current allocation value, ideal allocation value, and allocation tolerance value; and for each token pair having an urgency value that is greater than an urgency threshold, determine a first token value for the target token based on a preferred value obtained from a third-party service, the maximum value, and the incremental value, wherein the first token value indicates a maximum amount of source tokens that is capable of being converted into a predetermined amount of target tokens in another collection, wherein the first token value is greater than the preferred value, and determine other collections that indicate a proposal to convert the target token into a source token for an amount less than or equal to the token value; and generate a first conversion itinerary, based on first token values and proposals of other collections, wherein the first conversion itinerary indicates the most optimal set of conversions to perform with respect to the other collections, such that source tokens and target tokens corresponding to active token pairs fall within the ideal allocation range.

2. The system of claim 1, wherein the instructions further include a decremental value, and wherein the computer executable instructions cause the processor to perform further operations to:

for each token pair having an urgency value that is less than or equal to the urgency threshold, determine a second token value for the target token of the passive token pair based on a preferred value obtained from a third-party service and the decremental value in the instructions, wherein the second token value indicates a maximum amount of source tokens that is capable of being converted into a predetermined amount of target tokens in another collection, and wherein the second token value is less than the preferred value, and determine other collections that indicate a proposal to convert the target token into the source token for an amount less than or equal to the second token value.

3. The system of claim 2, wherein the computer executable instructions cause the processor to perform further operations to:

generate a second conversion itinerary, based on second token values and proposals of other collections, wherein the second conversion itinerary indicates the most optimal set of exchanges to perform with the other collections, such that the source tokens and the target tokens remain within the ideal allocation.

4. The system of claim 3, wherein source tokens in each token pair having an urgency value that is less than or equal to the urgency threshold is continuously converted into target tokens of the corresponding token pair until new instructions are received that includes a new maximum value, a new incremental value, and a new ideal allocation range for each of the two or more tokens.

5. The system of claim 1, wherein urgency values, that are greater than the urgency threshold, indicate that a source token and a target token in a corresponding token pair are outside the ideal allocation, and wherein the urgency values that are less than or equal to the urgency threshold indicate that a source token and a target token in a corresponding token pair are within the ideal allocation.

6. The system of claim 1, wherein an allocation tolerance value corresponding to a token of the two or more tokens is decreased according to a tolerance adjustment value for each conversion that is performed with respect to the token according to the conversion itinerary until the amount of the token falls within a corresponding ideal allocation.

7. The system of claim 1, wherein the computer executable instructions cause the processor to perform further operations to:

manage two or more additional token collections, wherein the token collection and the two or more additional token collections are managed by a single entity, and wherein the step of determining collections that indicate a proposal to convert the target token into a source token for an amount less than or equal to the token value is performed on the two or more additional token collections.

8. A non-transitory computer-readable medium including computer-executable instructions that, when executed by a computing device, causes the computing device to:

managing a token collection that includes two or more tokens, wherein a current amount of each of the two or more tokens is associated with a current allocation value;

receiving instructions that includes a maximum value, an incremental value and an ideal allocation range for each of the two or more tokens, wherein the ideal allocation includes a range of values defined by an ideal allocation value having a tolerance specified by an allocation tolerance value, and wherein tokens whose amount is to be increased to fall within the ideal allocation range are assigned to a source group, tokens whose amount is to be decreased to fall within the ideal allocation range are assigned to a target group, and tokens whose amount remains within the ideal allocation range are assigned to both the source group and the target group;

determining, for each possible token pair, an urgency value determined based on a source urgency value and a target urgency value, wherein each token pair includes a source token from the source group and a target token from the target group, and wherein a source urgency value is determined for the source token based on a corresponding current allocation value, ideal allocation value, and allocation tolerance value, and wherein a target urgency value is determined for the target token based on a corresponding current allocation value, ideal allocation value, and allocation tolerance value; and for each token pair having an urgency value that is greater than an urgency threshold, determining a first token value for the target token based on a preferred value obtained from a third-party service, the maximum value, and the incremental value, wherein the first token value indicates a maximum amount of source tokens that is capable of being converted into a predetermined amount of target tokens in another collection, wherein the first token value is greater than the preferred value, and determining other collections that indicate a proposal to convert the target token into a source token for an amount less than or equal to the token value; and generating a first conversion itinerary, based on first token values and proposals of other collections, wherein the first conversion itinerary indicates the most optimal set of conversions to perform with respect to the other collections, such that source tokens and target tokens corresponding to active token pairs fall within the ideal allocation range.

9. The non-transitory computer-readable medium of claim 8, wherein the source urgency value is represented by the following equation:

$$\text{source urgency value} = \frac{\text{current allocation value} - \text{ideal allocation value}}{\text{allocation tolerance value}}.$$

10. The non-transitory computer-readable medium of claim 8, wherein the target urgency is represented by the following equation:

$$\text{target urgency value} = \frac{\text{ideal allocation value} - \text{current allocation value}}{\text{allocation tolerance value}}.$$

11. The non-transitory computer-readable medium of claim 8, wherein the urgency value is represented by the following equation:

$$\text{urgency value} = \min\{\text{source urgency value}, \text{target urgency value}\}.$$

12. The non-transitory computer-readable medium of claim 8, wherein the first token value is represented by the following equation:

$$\text{first token value} = \min\{[\text{urgency value} - 1] \times \text{incremental value}, \text{maximum value}\}.$$

13. The non-transitory computer-readable medium of claim 8, wherein the second token value is represented by the following equation:

$$\text{second token value} = [1 - \text{urgency value}] \times \text{decremental value}.$$

14. A computerized method for automatic rebalancing of tokens in a token collection, the method comprising:

managing a token collection that includes two or more tokens, wherein a current amount of each of the two or more tokens is associated with a current allocation value;

receiving instructions that includes a maximum value, an incremental value and an ideal allocation range for each of the two or more tokens, wherein the ideal allocation includes a range of values defined by an ideal allocation value having a tolerance specified by an allocation tolerance value, and wherein tokens whose amount is to be increased to fall within the ideal allocation range are assigned to a source group, tokens whose amount is to be decreased to fall within the ideal allocation range are assigned to a target group, and tokens whose amount remains within the ideal allocation range are assigned to both the source group and the target group;

determining, for each possible token pair, an urgency value determined based on a source urgency value and a target urgency value, wherein each token pair includes a source token from the source group and a target token from the target group, and wherein a source urgency value is determined for the source token based on a corresponding current allocation value, ideal allocation value, and allocation tolerance value, and wherein a target urgency value is determined for the target token based on a corresponding current allocation value, ideal allocation value, and allocation tolerance value; and for each token pair having an urgency value that is greater than an urgency threshold, determining a first token value for the target token based on a preferred value obtained from a third-party service, the maximum value, and the incremental value, wherein the first token value indicates a maximum amount of source tokens that is capable of being converted into a predetermined amount of target tokens in another collection, wherein the first token value is greater than the preferred value, and determining other collections that indicate a proposal to convert the target token into a source token for an amount less than or equal to the token value; and generating a first conversion itinerary, based on first token values and proposals of other collections, wherein the first conversion itinerary indicates the most optimal set of conversions to perform with respect to the other collections, such that source tokens and target tokens corresponding to active token pairs fall within the ideal allocation range.

15. The computerized method of claim 14, wherein the two or more tokens are assets on a blockchain, in which each conversion performed according to the first conversion itinerary is recorded on the blockchain.

16. The computerized method of claim 15, wherein the allocation tolerance value includes an initial tolerance value and a final tolerance value, in which the initial tolerance value is decreased until it reaches the final tolerance value, and wherein the initial tolerance value is greater than the final tolerance value.

17. The computerized method of claim 16, wherein the tolerance adjustment value is determined based on a current allocation tolerance value, a tolerance adjustment rate, a current block index of the blockchain and a last updated block index of the blockchain, and wherein the current allocation tolerance value is the initial tolerance value or the tolerance adjustment value, which is a value between the initial tolerance value and the final tolerance value.

18. The computerized method of claim 17, wherein the tolerance adjustment rate is a predetermined value adjusted by an entity managing the token collection.

19. The computerized method of claim 16, wherein the initial tolerance value is represented by the following equation:

$$\text{initial tolerance} = \text{abs}\{\text{ideal allocation} - \text{current allocation}\}.$$

20. The computerized method of claim 17, wherein the tolerance adjustment value is represented by the following equation:

$$\text{tolerance adjustment value} = \max\{\text{current allocation tolerance value} - \text{tolerance adjustment rate} \times (\text{current block index} - \text{last updated block index}), \text{final tolerance value}\}.$$

* * * * *